(12) United States Patent  
Cowley

(10) Patent No.: US 11,666,126 B2  
(45) Date of Patent: Jun. 6, 2023

(54) MECHANISM COMBINING ARTICULATION AND SIDE-SHIFT

(71) Applicant: Daniel Joseph Cowley, Maricopa, AZ (US)

(72) Inventor: Daniel Joseph Cowley, Maricopa, AZ (US)

( * ) Notice: Subject to any disclaimer, the term of this patent is extended or adjusted under 35 U.S.C. 154(b) by 277 days.

(21) Appl. No.: 17/137,309

(22) Filed: Dec. 29, 2020

(65) Prior Publication Data

US 2021/0161261 A1  Jun. 3, 2021

Related U.S. Application Data

(63) Continuation-in-part of application No. PCT/US2019/023380, filed on Mar. 21, 2019.

(Continued)

(51) Int. Cl.
*A45B 25/02* (2006.01)
*A01B 59/00* (2006.01)

(Continued)

(52) U.S. Cl.
CPC ............ *A45B 25/02* (2013.01); *A01B 59/004* (2013.01); *A01B 71/06* (2013.01); *H01Q 1/125* (2013.01)

(58) Field of Classification Search
CPC ............ A45B 25/02; A45B 2023/0012; A45B 2200/1009; A45B 23/00; A01B 59/004;

(Continued)

(56) References Cited

U.S. PATENT DOCUMENTS 2,321,901 A * 6/1943 Eddy ...................... F16B 2/065  
248/161  
3,302,729 A * 2/1967 Pitzer ................... A01B 59/004  
172/449

(Continued)

FOREIGN PATENT DOCUMENTS

EP   2 678 221     11/2012  
WO  WO 2020/081111 A1   4/2020

OTHER PUBLICATIONS

Bowman, G., ed., "Tool-Pivoting Guidance", Steel in the Field—A Farmer's Guide to Weed Management Tools, https://www.sare.org/wp-content/uploads/Steel-in-the-Field.pdf, 2002, pp. 33, the Sustainable Agriculture Network (SAN), with funding from the Sustainable Agriculture Research and Education (SARE) program of the CSREES, U.S. Department of Agriculture.

(Continued)

*Primary Examiner* — Paul N Dickson  
*Assistant Examiner* — Timothy Wilhelm

(57) ABSTRACT

A coupling mechanism controls the location of the central primary draft load transmitting fixed-length link independently of the coupler. The coupling mechanism allows for translation in at least three orthogonal directions and for rotation of two distinct planes between coupled components, thereby providing a means for lateral shifting and articulation. The coupling mechanism mitigates unexpected rotation by restricting rotation along a longitudinal axis of the fixed-length link. Rotation of the coupling mechanism is furthermore controlled by means of a indexing turntable. The orientation and the position of the coupling mechanism is therefore determinant and predictable.

19 Claims, 16 Drawing Sheets

Related U.S. Application Data

(60) Provisional application No. 62/748,166, filed on Oct. 19, 2018.

(51) Int. Cl.
    *A01B 71/06*     (2006.01)
    *H01Q 1/12*     (2006.01)

(58) Field of Classification Search
    CPC ........ A01B 71/06; H01Q 1/125; B64C 11/00; B64C 11/06; B64C 11/32; B64D 35/00; B60D 1/32; B60D 1/065; B60D 1/1675; B60D 1/46; B60D 1/06; B60D 1/322; B60D 1/167
    See application file for complete search history.

(56) References Cited

U.S. PATENT DOCUMENTS

| | | | | |
|---|---|---|---|---|
| 3,420,550 | A * | 1/1969 | Willy | A01B 59/067 172/450 |
| 3,432,184 | A * | 3/1969 | Tweedy | A01B 63/111 280/481 |
| 4,034,999 | A * | 7/1977 | Jackson | A01B 59/004 280/461.1 |
| 4,146,246 | A * | 3/1979 | Geisthoff | B60D 1/04 172/275 |
| 4,149,736 | A * | 4/1979 | von Allworden | A01B 59/004 172/450 |
| 4,194,437 | A * | 3/1980 | Rosheim | B25J 17/0275 92/120 |
| 4,256,323 | A * | 3/1981 | McBride | B60D 1/06 280/495 |
| 4,360,216 | A * | 11/1982 | Wiemers | B62D 49/02 172/272 |
| 4,565,487 | A * | 1/1986 | Kroczynski | B60F 3/00 414/730 |
| 4,821,594 | A * | 4/1989 | Rosheim | B25J 17/0266 901/28 |
| 5,116,190 | A * | 5/1992 | Silke | B25J 19/063 901/29 |
| 5,160,157 | A * | 11/1992 | Hubler | B60D 1/06 280/901 |
| 5,239,883 | A * | 8/1993 | Rosheim | B25J 17/0258 901/29 |
| 5,346,018 | A * | 9/1994 | Koster | A01B 59/048 37/231 |
| 5,385,363 | A * | 1/1995 | Morey | B60D 1/06 280/511 |
| 5,697,454 | A * | 12/1997 | Wilcox | A01B 59/068 280/460.1 |
| 5,997,024 | A * | 12/1999 | Cowley | A01B 59/004 172/605 |
| 6,024,372 | A * | 2/2000 | Colibert | B60D 1/06 280/901 |
| 6,026,703 | A * | 2/2000 | Stanisic | B25J 17/0266 464/106 |
| 6,321,851 | B1 * | 11/2001 | Weiss | A01B 59/062 280/477 |
| 6,330,837 | B1 * | 12/2001 | Charles | B25J 17/0266 901/29 |
| RE37,492 | E * | 1/2002 | Shoquist | B60S 9/04 280/475 |
| 6,769,238 | B2 * | 8/2004 | Pellenc | B62D 49/0607 56/328.1 |
| 7,353,885 | B2 * | 4/2008 | Nordhoff | B60D 1/141 172/272 |
| 7,600,574 | B2 * | 10/2009 | Chauvel | A01B 59/064 172/439 |
| 7,686,529 | B1 * | 3/2010 | Le | B64G 1/646 403/78 |
| 7,862,524 | B2 * | 1/2011 | Carignan | B25J 17/025 601/5 |
| 8,333,766 | B2 * | 12/2012 | Edelhauser | A61B 17/62 606/56 |
| 8,356,831 | B2 * | 1/2013 | Pollock | B60D 1/02 280/479.3 |
| 8,371,187 | B2 * | 2/2013 | Payandeh | B25J 13/02 74/471 XY |
| 8,382,207 | B2 * | 2/2013 | Altemeier | G05G 11/00 298/22 P |
| 8,408,325 | B2 * | 4/2013 | Kapfer | A01B 59/004 172/663 |
| 8,430,418 | B2 * | 4/2013 | McCoy | B60D 1/249 280/438.1 |
| 8,460,222 | B2 * | 6/2013 | Garrec | B25J 9/0006 602/5 |
| 8,495,927 | B2 * | 7/2013 | Namoun | F15B 15/1447 74/490.06 |
| 9,169,735 | B2 * | 10/2015 | Stamps | B64C 11/06 |
| 9,193,452 | B2 * | 11/2015 | Carreker | B64C 27/52 |
| 9,340,078 | B2 * | 5/2016 | Benson | B60D 1/246 |
| 9,475,530 | B1 * | 10/2016 | Moyer | B60B 33/00 |
| 9,944,138 | B2 * | 4/2018 | Kemper | B60D 1/06 |
| 10,462,953 | B2 * | 11/2019 | Frascella | A01F 15/08 |
| 10,569,413 | B2 * | 2/2020 | Angold | A61H 1/0274 |
| 10,765,053 | B1 * | 9/2020 | Keigley | A01B 31/00 |
| 10,912,244 | B2 * | 2/2021 | Kilby | A01B 59/004 |
| 10,925,361 | B2 * | 2/2021 | Ma | A45B 23/00 |
| 2005/0012301 | A1 * | 1/2005 | Scharmuller | B60D 1/583 280/295 |
| 2014/0103619 | A1 * | 4/2014 | Motts | B60D 1/06 280/511 |
| 2014/0110918 | A1 * | 4/2014 | McCoy | B60D 1/488 116/212 |
| 2015/0197125 | A1 * | 7/2015 | Kemper | B60D 1/06 280/446.1 |
| 2020/0406695 | A1 * | 12/2020 | Andersen | B62D 53/0842 |
| 2021/0127542 | A1 * | 5/2021 | Hingne | A01B 59/004 |
| 2021/0237524 | A1 * | 8/2021 | Singh | B60D 1/06 |
| 2022/0041024 | A1 * | 2/2022 | Whipple | B60D 1/322 |
| 2022/0111691 | A1 * | 4/2022 | Few | B60D 1/1675 |
| 2022/0355924 | A1 * | 11/2022 | Parham, Jr. | B64C 11/32 |

OTHER PUBLICATIONS

Bowman, G., ed., "Side-Shift Guidance", Steel in the Field—A Farmer's Guide to Weed Management Tools, https://www.sare.org/wp-content/uploads/Steel-in-the-Field.pdf, 2002, pp. 32, the Sustainable Agriculture Network (SAN), with funding from the Sustainable Agriculture Research and Education (SARE) program of the CSREES, U.S. Department of Agriculture.

Thacher, G. W. and Coates, W. E., "How the Quick Hitch Guidance Systems Work and Their Practical Applications", https://cals.arizona.edu/crop/equipment/quickhitch.html, 2002, University of Arizona, College of Agriculture and Life Sciences.

Smith, L.A., Shafer, R.L., Young, R.E, "Control Algorithms for Tractor-Implement Guidance", 1985, pp. 415-419, Transactions of ASAE.

Coates, W., "Performance Evaluation of Three-point Hitch Guidance Systems", 2002, pp. 657-660, American Society of Agricultural Engineers ISSN 0883-8542, Applied Engineering in Agriculture, vol. 18(6).

Kocher, M.F., Smith, M.B., Grisso, R.D., Bashford, L.L., "Performance Tests of Three-point Mounted Implement Guidance Systems: I. Procedure", 2000, pp. 595-603, American Society of Agricultural Engineers 0883-8542 / 00 /1606-595, Applied Engineering in Agriculture, vol. 16(6).

Kocher, M.F., Smith, M.B., Grisso, R.D., Young L.J., "Performance Tests of Three-point Mounted Implement Guidance Systems: II. Results", 2000, pp. 605-611, American Society of Agricultural Engineers 0883-8542 / 00 /1606-595, Applied Engineering in Agriculture, vol. 16(6).

(56) References Cited

OTHER PUBLICATIONS

Smith, A.L, Shafer, R.L., Bailey, A.C.,"Verification of Tractor Guidance Algorithms", 1987, pp. 302-310, Transactions of ASAE, vol. 30(2):Mar.-Apr.

* cited by examiner

MECHANISM COMBINING ARTICULATION AND SIDE-SHIFT

CROSS REFERENCE TO RELATED APPLICATIONS

This application claims priority under 35 U.S.C. § 119 to provisional patent application U.S. Ser. No. 62/748,166, filed Oct. 19, 2018. The provisional patent application is herein incorporated by reference in its entirety, including without limitation, the specification, claims, and abstract, as well as any figures, tables, appendices, or drawings thereof.

This application also claims priority under an international patent application PCT/US2019/023380, filed Mar. 21, 2019. The WIPO patent application is herein incorporated by reference in its entirety, including without limitation, the specification, claims, and abstract, as well as any figures, tables, appendices, or drawings thereof.

FIELD OF THE INVENTION

The present invention relates generally to a coupling mechanism and corresponding method of use. The coupling mechanism may be applied to solve problems in at least the consumer products, aeronautical, agricultural, astronautical, civil, electrical, electromechanical, industrial, marine, mechanical, software and solar engineering fields. More particularly, but not exclusively, the present invention relates to a mechanism providing concurrent lateral shifting, articulation and indexing which mitigates unexpected rotation and indeterminate positioning.

BACKGROUND OF THE INVENTION

The background description provided herein is for the purpose of generally presenting the context of the present disclosure. Work of the presently named inventor, to the extent the work is described in the present disclosure, as well as aspects of the description that may not otherwise qualify as prior art at the time of filing, are neither expressly nor impliedly admitted as prior art.

In agricultural row cropping, articulated and side-shift guidance for implements directly conflicts with the standard 3-point hitch geometry of tractors. Thus, agricultural vehicles would benefit from having a hitch mechanism which could both steer and laterally shift the implement to reduce lateral forces which would otherwise be transmitted to the vehicle. When the power take-off shaft is incorporated within the mechanism, it protects the operator from contact with the rotating shafts further reducing the risk of injury by eliminating the need for human presence during implement coupling and uncoupling.

Such a mechanism has been described by U.S. Pat. No. 5,997,024, issued Dec. 7, 1999. The mechanism includes three variable links connected from the base to the platform. However, the mechanism of this patent is unstable, resulting in expected rotation and indeterminant positions of the hitch coupler.

It is known that aircraft when landing with a crosswind component require pilots to execute a crab or slip maneuver to align the craft with the runway at the time of touchdown. Slower ground speeds by redirecting airflow over the wing surfaces at a better angle of attack and the ability of the aircraft to compensate for the crosswind at the time of landing would greatly reduce pilot stress and increase the safety of the landing.

Drones and helicopters are known to have a mechanism, such as described in international patent application PCT/US2011/037395 filed on 20 May 2011, that uses a double swashplate design to modify the blade angle or pitch on a rotary-wing aircraft. The distance between the swashplates varies, so even though the swashplates may be constrained from angular rotation, the spherical joints that position them on an axis are always free to translate independently along the same axis. The center leg between spherical joints is not a fixed length. Contrary to the prior art, the blades of the present invention are fixed pitch and unaffected by the mechanism. Therefore, the present invention is not anticipated in the former claims by any of the embodiments provided.

Marine vessels are also navigated by a simple rudder or by redirecting the flow of water at the stern of the ship. A mechanism that can both side-shift and articulate at the same time would provide more stability to turn the boat by better controlling the thrust vector with respect to the center of mass.

Land-based traction vehicles with independent wheel suspension systems using a mechanism that can simultaneously side-shift and articulate would provide modification of the wheelbase, suspension height, and the king pin camber, caster and inclination angles throughout the turn allowing for better handling performance.

It is further known that solar positioning systems need to track sun trajectories at various location in terrestrial space or outer space. Such systems could utilize a mechanism that can simultaneously side-shift and articulate to control shade or solar intensity whichever was appropriate for the application.

Thus, there exists a need in the art for a mechanism which addresses the deficiencies in the art.

SUMMARY OF THE INVENTION

Therefore, it is a primary object, feature, or advantage of the present invention to improve on or overcome the deficiencies in the art.

It is still a further object, feature, or advantage of the present invention to provide a mechanism that transfers load from on rigid frame to another whereby the force vectors may be adjusted with respect to position and direction.

It is still yet a further object, feature, or advantage of the present invention to provide a mechanism which restricts and further indexes rotation of a fixed-length link and a rigid frame, e.g., a platform or a base, along a longitudinal axis of the fixed-length link.

It is still yet a further object, feature, or advantage of the present invention to provide a mechanism which couples two objects together, wherein at least one of the objects is movable with respect to the other object.

It is still yet a further object, feature, or advantage of the present invention to provide a mechanism that may be used in a wide variety of applications. For example, the mechanism can be coupled to one or more transmission devices selected from the group consisting of, but not limited to, a stand, an agricultural vehicle, a car, a truck, an all-terrain vehicle, an all-terrain personal recreation vehicle, an airplane, a drone, a boat, an axle, a shaft, a rocket, a jet boat, a spacecraft, an agricultural implement, an umbrella, a parasol, an array of solar panels, a satellite dish, an antenna, a nozzle, an aircraft propeller, a boat impeller, and an automotive wheel.

It is still yet a further object, feature, or advantage of the present invention to provide a mechanism that improves safety. For example, the mechanism may align and couple two objects together automatically, freeing the coupling process from significant human intervention.

It is still yet a further object, feature, or advantage of the present invention to expand on the previous objective to provide a means to automate the coupling and uncoupling of all systems (logic, electric, hydraulic and mechanic) necessary to connect an agricultural tractor and an agricultural implement, for instance. To remove as much as possible the human presence in the interface between them.

It is still yet a further object, feature, or advantage of the present invention to provide a mechanism that is cost effective.

It is still yet a further object, feature, or advantage of the present invention to provide a mechanism that is reliable and durable and has a long usable life.

It is still yet a further object, feature, or advantage of the present invention to provide a mechanism which is easily used and reused.

It is still yet a further object, feature, or advantage of the present invention to provide a mechanism that is easily manufactured, assembled, installed, disassembled, uninstalled, customized, and repaired.

It is still yet a further object, feature, or advantage of the present invention to provide a mechanism that is aesthetically pleasing.

It is still yet a further object, feature, or advantage of the present invention to incorporate a mechanism into a system accomplishing some or all of the previously stated objectives.

It is still yet a further object, feature, or advantage of the present invention to provide methods of using, manufacturing, installing, or repairing a mechanism accomplishing some or all of the previously stated objectives.

It is still yet a further object, feature, or advantage of the present invention to provide methods of connecting two or more of these coupling to extend the range of motion accomplishing some or all of the previously stated objectives.

The previous list of objects, features, or advantages of the present invention are not exhaustive and do not limit the overall disclosure. Likewise, the following list of aspects or embodiments do not limit the overall disclosure. It is contemplated that any of the objects, features, advantages, aspects, or embodiments disclosed herein can be integrated with one another, either in full or in part, as would be understood from reading the disclosure.

According to some aspects of the present disclosure, a method for providing articulation capabilities comprises a base, a fixed-length link having a longitudinal axis running between the platform and the base origins, allowing for translation in at least three orthogonal directions of a platform origin at the distal end of the fixed-length link with respect to a base origin located on the base, restricting rotation of the fixed-length link, the platform, and the base about the longitudinal axis between the base and platform origins.

According to some aspects of the present disclosure, a method for providing simultaneous lateral shifting and articulation capabilities comprises carrying primary draft or thrust loads between a platform and a base with a fixed-length link, said fixed-length link having a longitudinal axis running between the platform and the base origins, allowing for translation in at least three orthogonal directions of a platform origin located on the platform with respect to a base origin located on the base, restricting rotation of the fixed-length link, the platform, and the base about the longitudinal axis between the base and platform origins, allowing for the remaining rotations of the platform with variable-length links actuators pivotally connected to the platform and the fixed-length link or alternatively, the platform and the base, and allowing for rotations of the fixed-length link with variable-length links or alternatively bushing slides with variable-length links pivotally connected to the base.

According to some additional aspects of the present disclosure, a turntable rotates freely about the center longitudinal axis of the base or rotates by means of an indexing gear, friction roller or belt/chain drive and a rotational actuator, such as a crank, a stepper motor or hydraulic motor to control the orientation of the base relative to the turntable.

According to some additional aspects of the present disclosure, the method further comprises receiving an input with an intelligent control, and in response to receiving the input, controlling with the intelligent control a location of the platform origin and base origin and controlling an orientation of the platform and the base.

According to some additional aspects of the present disclosure, the intelligent control determines the location of the platform origin and base origin and the orientation of the platform and the base with an algorithm.

According to some additional aspects of the present disclosure, the method further comprises sensing the input with a sensor.

According to some additional aspects of the present disclosure, the input relates to an environmental condition.

According to some additional aspects of the present disclosure, the method further comprises playback of the chronological sequence for a path and orientation of the base and the platform from preloaded data.

According to some additional aspects of the present disclosure, the location of the platform origin and base origin and the orientation of the platform and the base are controlled by the intelligent control continuously.

According to some additional aspects of the present disclosure, the method further comprises calibrating a home position with the intelligent control.

According to some additional aspects of the present disclosure, the method further comprises returning the platform and the base to a trim position with the intelligent control when controls for the intelligent control are released.

According to some additional aspects of the present disclosure, the method further comprises transmitting force between the platform and the base.

According to some additional aspects of the present disclosure, the method further comprises transmitting power between the platform transmission device and the base transmission device.

According to some additional aspects of the present disclosure, the method further comprises coupling the platform to a movable object and the base to a fixed object.

According to some additional aspects of the present disclosure, the method further comprises coupling the platform to a movable object and the base to an indexed turntable coupled to a fixed object.

According to some additional aspects of the present disclosure, the method further comprises coupling the platform to a fixed object and the base including an indexed turntable to a moveable object.

According to some other aspects of the present disclosure, an attachment mechanism comprises a base having a base center and a base perimeter, a movable platform having a platform center and a platform perimeter, a fixed-length link, a second end pivotally connected to the fixed-length link on the link anchor surface near the platform end of the fixed length and at least two variable-length links each having a first end pivotally connected to the platform perimeter and a second end pivotally connected to the fixed-length link on the link anchor surface near the base end of the fixed length or a second end pivotally connected to the base perimeter and at least two variable-length links each having a second end pivotally connected to the base perimeter.

The fixed-length link comprises a platform end pivotally connected to the movable platform at the platform center, a base end pivotally connected to the base at the base center, and a longitudinal axis running from platform center to the base center. Rotation of the fixed-length link, the base and the platform are restricted about the longitudinal axis. The base, platform and fixed-length link all rotate about the longitudinal axis of the fixed-length link together, allowing for the remaining rotations of the base and the platform to occur independently. This rotation is restricted by a pin-in-slot, universal or a homokinetic joint.

According to some additional aspects of the present disclosure, the fixed-length link further comprises an intermediate power shaft with pin-in-slot, universal, homokinetic joints or a flexible power shaft running axially through the fixed-length link to transmit power from the base rotating shaft to the platform rotating shaft.

According to some additional aspects of the present disclosure, the base rotating shaft is rotationally connected to the base and the platform rotating shaft is rotationally connected to the platform and pivot about the base origin and platform origin, respectively.

According to some additional aspects of the present disclosure, there are at least two pairs of variable-length links, the variable-length links are added in pairs, one to the base and one to the platform. When there are just two pairs of variable-length links, they are spaced equidistant from each other around the perimeter of the base and platform. The two base perimeter pairs installed consecutively and in the same sense, then the first platform variable-length link is installed a quarter distance around the perimeter from the last base variable-length link. The platform perimeter pairs are also installed in the same sense around the circumference. When installed properly the base pairs will be directly opposite the platform pairs.

If there are more than two pairs, the variable-length links are spaced equidistant from each other around both the base and the platform perimeters, but installed in an opposite sense. For example, perimeter then platform perimeter, etc.

According to some additional aspects of the present disclosure, there are at least two variable-length links connected to the base perimeter.

According to some additional aspects of the present disclosure, the second end of each of the variable-length links connected to the base is pivotally connected to the fixed-length link, extending away from the fixed-length link, and to platform link surface near the platform end.

According to some additional aspects of the present disclosure, there are at least two variable-length links connected to the platform perimeter.

According to some additional aspects of the present disclosure, the second end of each of the variable-length links connected to the platform is pivotally connected to the fixed-length link, extending away from the fixed-length link, and to base link surface near the base end or the second end of each of the additional variable-length links connected to the platform is pivotally connected to the base perimeter.

According to some additional aspects of the present disclosure, wherein each of the variable-length links include a linear actuator, consisting of a servo motor with arm, a hydraulic cylinder, an electric screw actuator or a mechanical turnbuckle and at each end the pivotal connection is formed with a spherical joint.

According to some additional aspects of the present disclosure, the base and the turntable are coupled together with an indexing mechanism.

According to some additional aspects of the present disclosure, the indexing mechanism comprises a belt, a friction roller, or a gear.

According to some additional aspects of the present disclosure, the indexing mechanism comprises a lever, a pulley, a crank, a rotary hydraulic actuator or an electric motor connected to a rotary actuator, consisting of a linkage, a belt drive, a friction drive or a gear mechanism to control the relative angular orientation of the base relative to the turntable.

According to some additional aspects of the present disclosure, the indexing mechanism comprises an actuator may also include rotational angle sensing to be used by the intelligent controlling devices of previous discussion.

According to some other aspects of the present disclosure, a system comprises the attachment mechanism and transmission devices connected to the platform and the base to transmit loads.

According to some other aspects of the present disclosure, a system comprises the attachment mechanism and transmission devices connected to the platform and the base to transmit power.

According to some other aspects of the present disclosure, a system comprises the attachment mechanism coupled to an umbrella, solar panel, or solar collector to provide orientation for shade or maximum energy absorption.

According to some other aspects of the present disclosure, a system comprises the attachment mechanism coupled to a non-powered automotive wheel to provide steering and rotation.

According to some additional aspects of the present disclosure, the system further comprises the attachment mechanism coupled to transmission devices attached to the base rotating shaft and platform rotating shaft, respectively, both shafts coupled to an intermediate power shaft with universal or homokinetic joints or a flexible power shaft running axially through the fixed-length link to transmit power between the base rotating shaft and the platform rotating shaft.

These or other objects, features, and advantages of the present invention will be apparent to those skilled in the art after reviewing the following detailed description of the illustrated embodiments, accompanied by the attached drawings.

Figure 1:
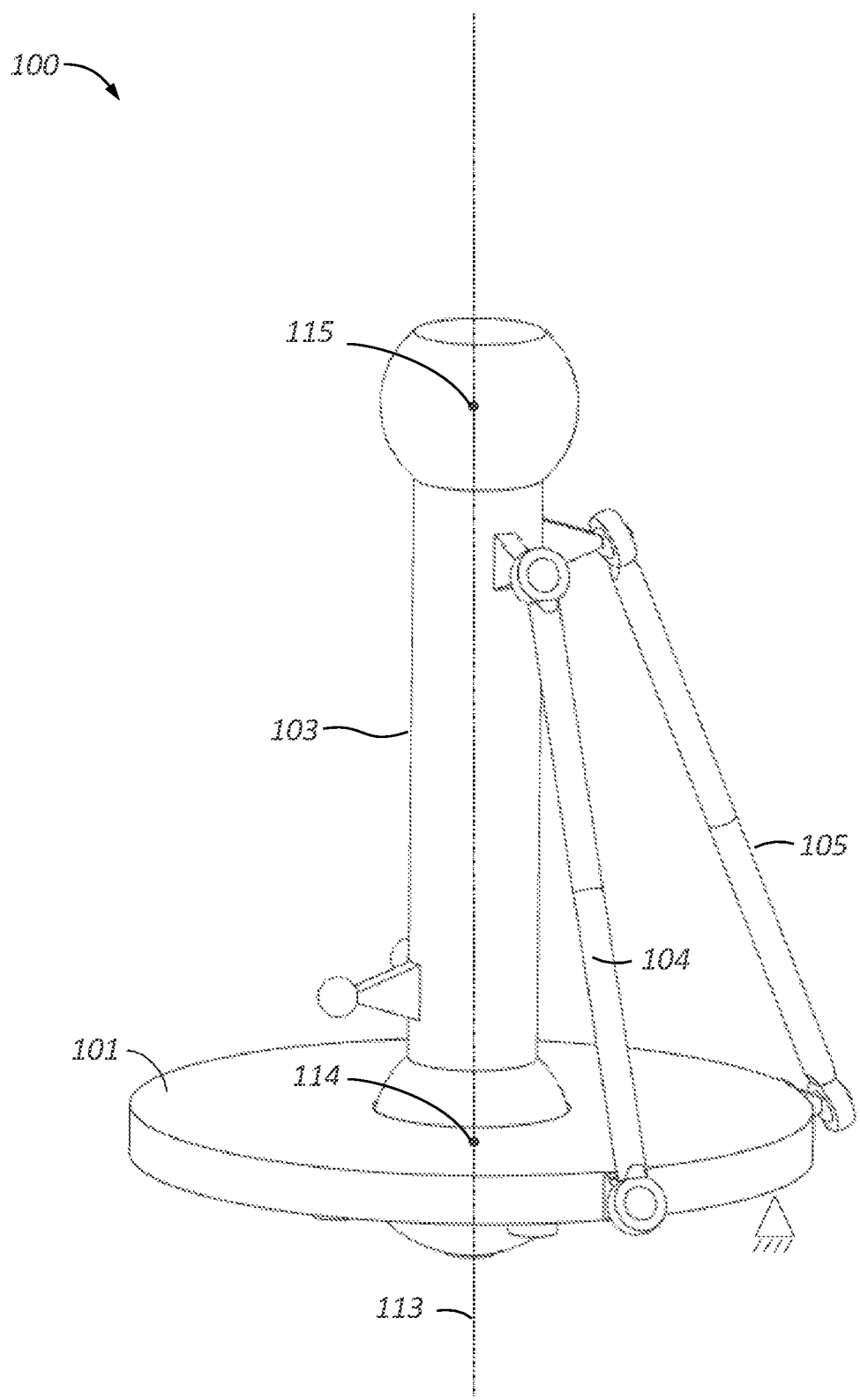
FIG. 1 shows a perspective view depicting how the lower variable and actuatable length links are attached to the perimeter of the base and the fixed-length link and used to position the fixed-length link relative to the base, according to some aspects of the present disclosure. While reference numerals of FIG. 1 relate to the base and base origin, it should be appreciated the platform and platform origin will produce a substantially identical view.
Figure 2:
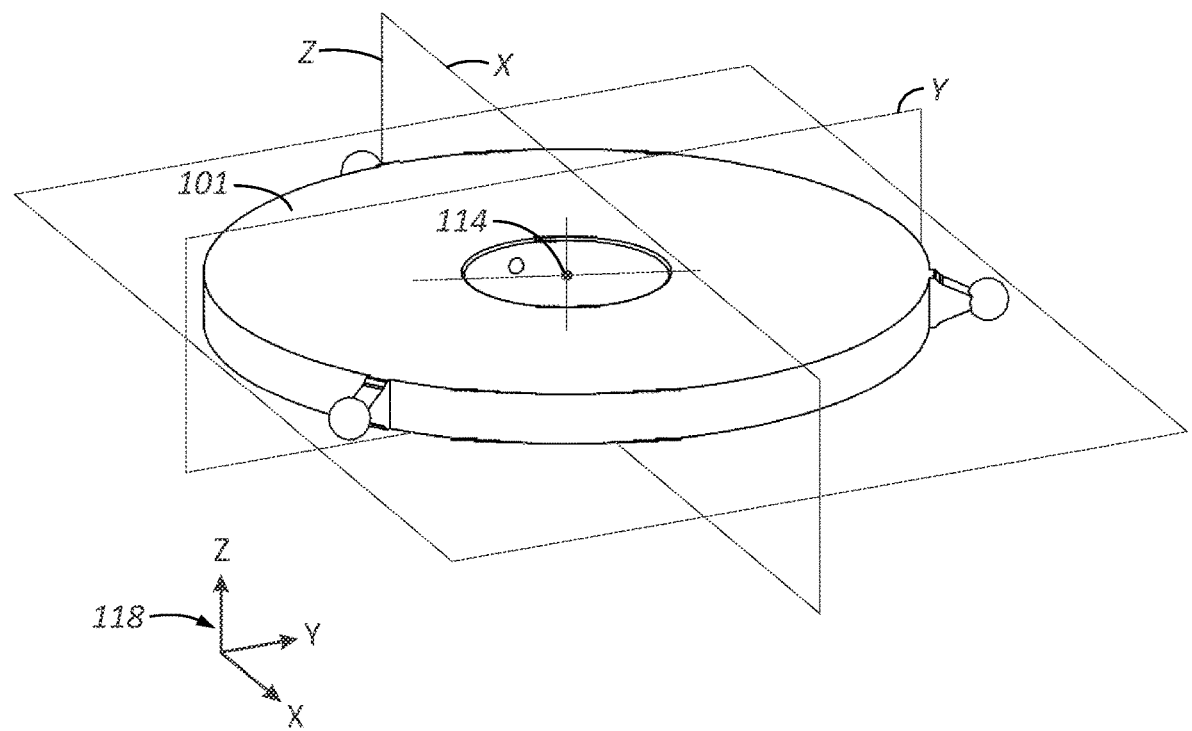
FIG. 2 shows a perspective view of a rigid frame have a slot for a spherical joint centrally located at an origin point, according to some aspects of the present disclosure. While reference numerals of FIG. 2 relate to the base and base origin, it should be appreciated the platform and platform origin will produce a substantially identical view.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, angle, wavelength, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

Referring now to the drawings, the FIGS. 5-8 and 10-13 show various embodiments for a mechanism 100 combining articulation, side-shift and indexing. The mechanism 100 is a parallel manipulator similar to a Gough-Stewart platform except in that the mechanism 100 more effectively mitigates unexpected rotation when coupling two transmission devices to one another and has predictable but limited vertical travel of the platform to the extent of the motion of the fixed-length link. The mechanism 100 improves upon the Gough-Stewart platform by (1) reducing the number of actuators that are required, (2) requiring simpler mathematics for control, and (3) providing a neutral structure for incorporating a rotating drive shaft.

The structure of mechanism 100 comprises a base 101 and a platform 102. The platform 102 and the base 101 are spherically and pivotally connected to a platform end and a base end of a fixed-length link 103 at a platform origin, platform center, or platform center origin and a base origin, base center or base center origin, respectively. The fixed-length link 103 freely rotates about a spherical joint but restricts the rotation of the base 101 relative to the platform 102 along a longitudinal axis 113.

The platform 102 and the base 101 can also be generically referred to as rigid frames. It is contemplated that a rigid frame is a body with at least one rigid surface which is preferably where the platform 102 and base 101 spherically and pivotally connected to each end of a fixed-length link 103.

The platform 102 and the base 101 may take on any known three-dimensional shape and may be purposely shaped to limit collisions between components which may limit the range of motion of the mechanism 100. For example, the shape of a rigid frame may be selected from the group consisting of cylinders, ellipsoids (including spheres), partial ellipsoids (including hemispheres), regular polyhedrons (including pyramids, cubes, etc.), irregular polyhedrons, cones, surfaces of revolution (including tori), helixes (i.e., coils and springs), and a combination thereof. A rigid frame may comprise any one or a combination of known rigid materials, such as metals and metallic alloys, steel, plastics, composites, wood, stone, glass, and synthetic materials imitating the properties of any of the preceding materials. The rigid frame may be solid, partially hollow, or completely hollow.

Similarly, a rigid surface of the platform 102 and the base 101 may take on any known two-dimensional shape. For example, the shape of the rigid surface may be selected from the group consisting of ovals (including ellipses, circles, etc.), partial ellipses (including semicircles), stadiums, regular polygons (including triangles, rectangles, etc.), irregular polygons, cones, biaxial-curved or Non-uniform Rational B-spline (NURBS) surfaces and a combination thereof.

The platform 102 and the base 101 or a rigid surface of the platform 102 the base 101 may even take on shapes of letters or numbers. The shape of the aforementioned objects may also comprise curves and splines extruded in two or three dimensions. The term "spline" is defined as a piecewise polynomial parametric curve, the shape of which depends on the values of the intervals it is made up of. In other words, the term "spline" encompasses straight lines and irregularly shaped lines.

The base 101 (or alternatively, of the fixed-length link 103 if the base is completely fixed) is oriented by at least two lower variable-length links 104-106 (106 not shown). The lower variable-length links 104-106 (106 not shown) are spherically connected between the base 101 and the fixed-length link 103 at a first location on the base perimeter and at a second location towards a platform end on the surface 117 of the fixed-length link 103, as shown in FIG. 1. Alternatively, the base 101 is oriented by at least two lower variable-length links 104-106 (106 not shown). The lower variable-length links 104-106 (106 not shown) are spherically connected between the base 101 and the fixed-length link 103 at a first location on the base perimeter and at a second location towards a platform end on the platform link anchor surface 117 of the fixed-length link 103, as shown in FIG. 1. In the embodiment of FIG. 1, the lower variable-length links 104-105 are preferably set at 90 degrees, but no more than 120 degrees, to each other. If there are three or more (N/2 times) lower variable-length links 104-106 (106 not shown), then they are preferably equidistant and symmetrically arranged around the perimeter of the base 101.

The platform 102 is oriented by at least two upper variable-length links 107-109 (109 not shown) spherically connected between the fixed-length link 103 and the platform 102 at a first location on the platform perimeter and a second location towards a base end of the fixed-length link 103. The upper variable-length links 107-109 (109 not shown) are preferably set at right angles to each other. If there is a third or more upper variable-length links 109 (109 not shown), then they are preferably symmetrically arranged around the perimeter of the platform 102, spaced equidistant from the lower links 104, 105, and 106 (106 not shown) around the perimeter.

Figure 6:
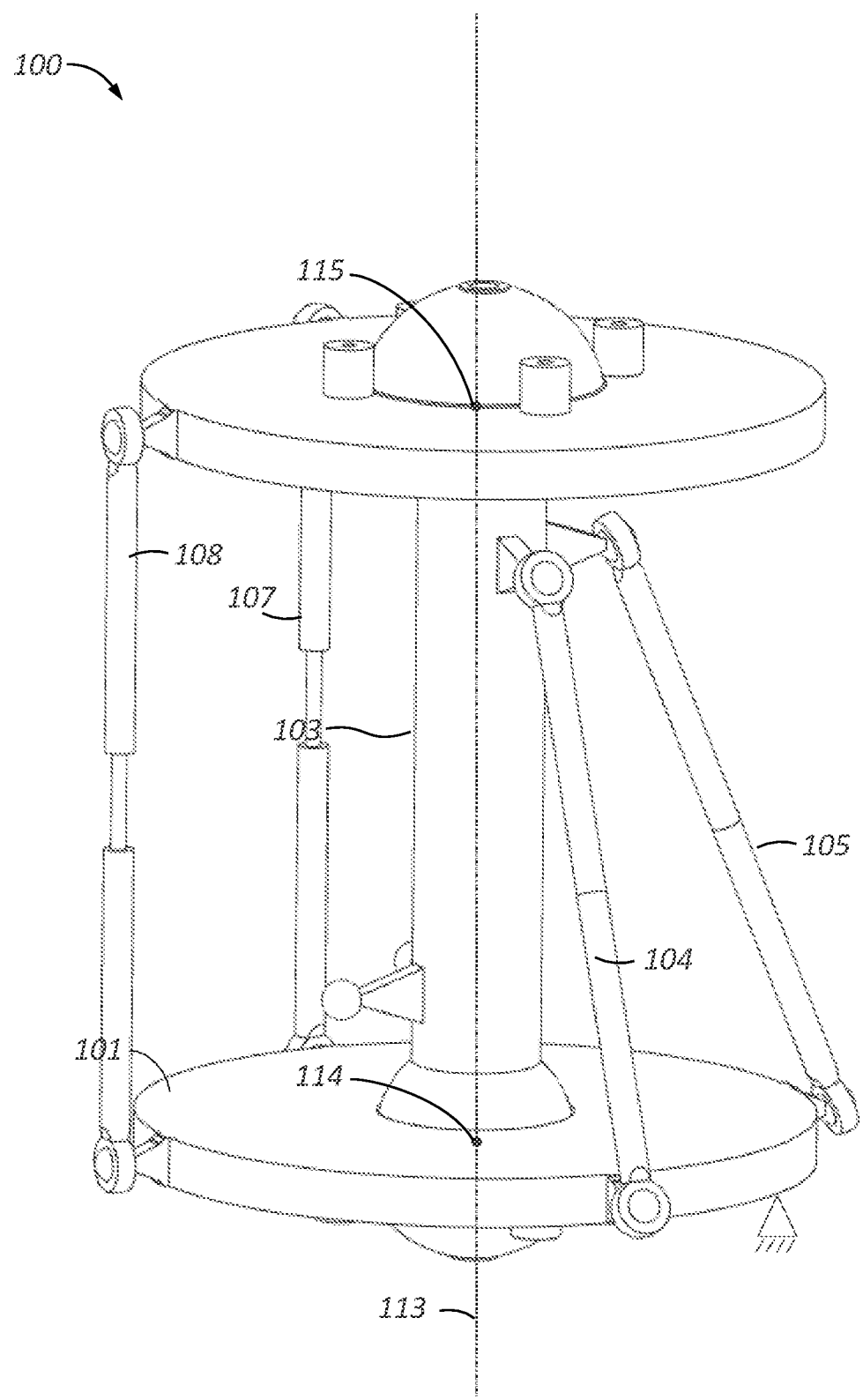
FIG. 6 shows a perspective view of an embodiment for a mechanism combining articulation and side-shift which depicts platform variable-length links attached to the base perimeter, according to some aspects of the present disclosure.
Figure 7:
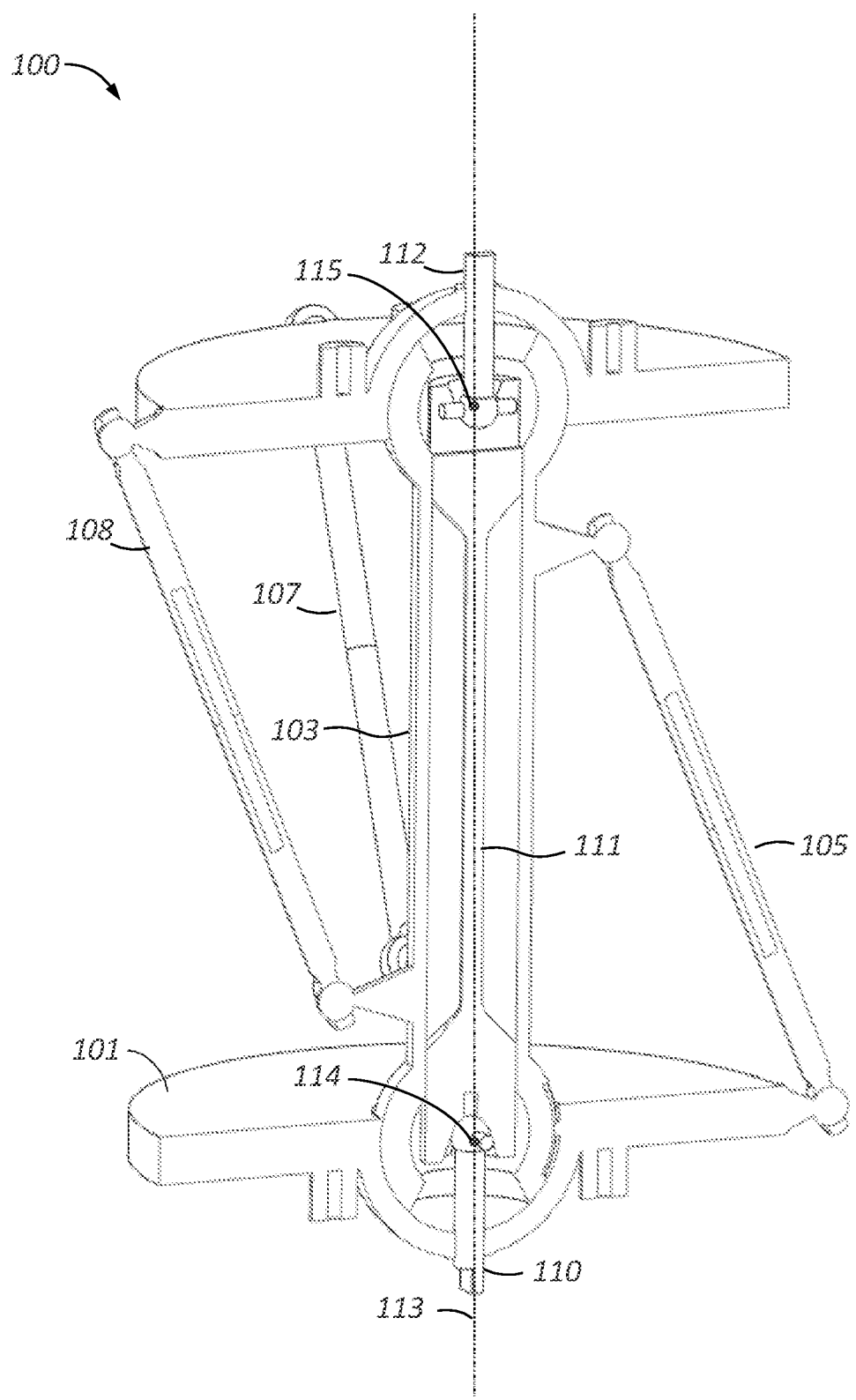
FIG. 7 shows a cross-section view depicting how power is internally routed through the base, the hollow fixed-length link and the platform of the mechanism combining articulation and side-shift, according to some aspects of the present disclosure.
Figure 8:
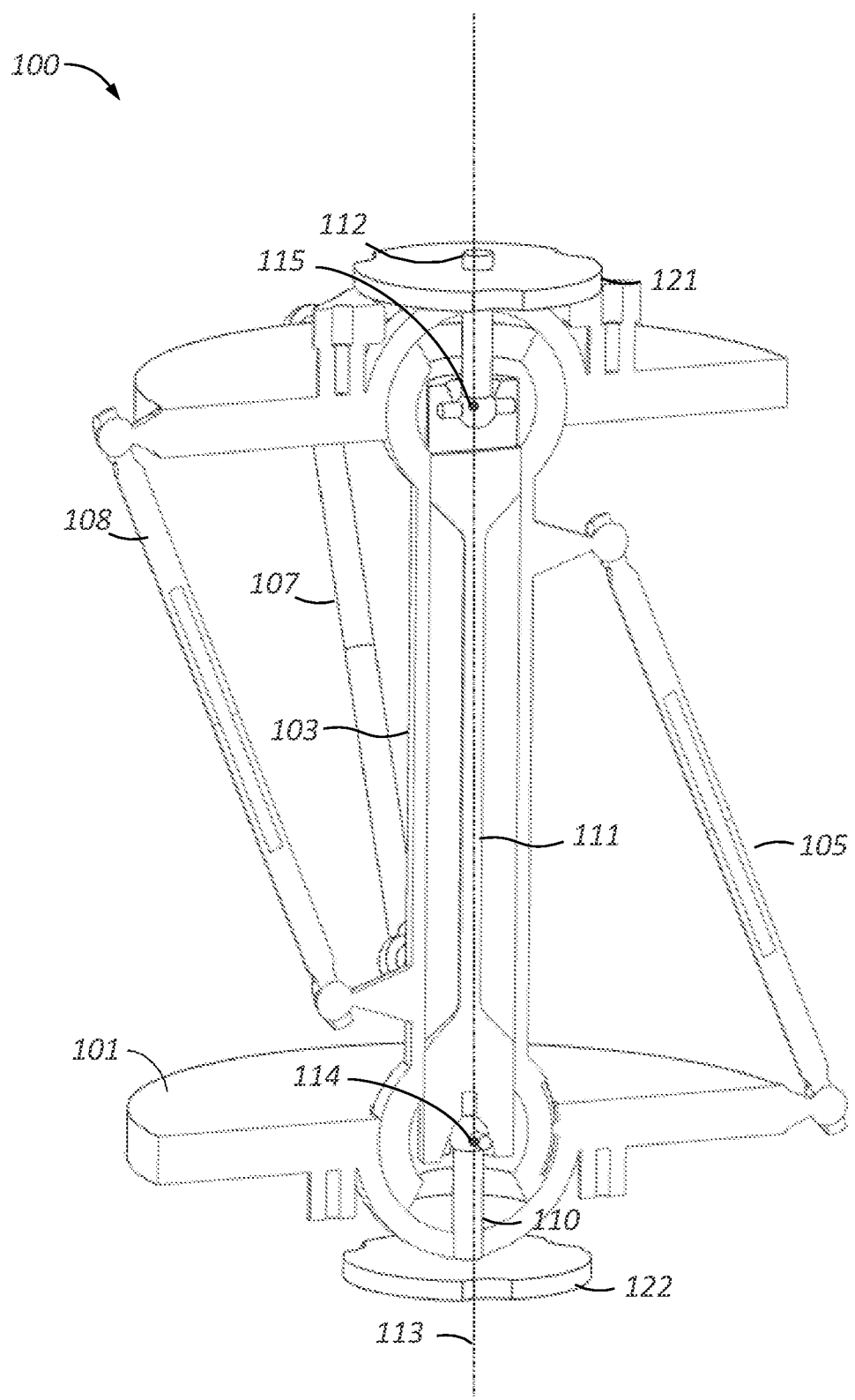
FIG. 8 shows a perspective view depicting the mechanism combining articulation and side-shift with the power transmission devices, according to some aspects of the present disclosure.

It is contemplated that an embodiment exists where the upper variable-length links 107-109 (109 not shown) are spherically connected between the 102 and the base 101 at a first location on the platform perimeter and a second location on the base perimeter while the lower length links are spherically connected between the base 101 and the fixed-length link 103 at a first location on the base perimeter and at a second location towards a platform end of the fixed-length link 103. In such an embodiment, the spherical connection locations would essentially mirror that which is shown in FIG. 1. In other words, FIG. 1 already encompasses this embodiment. One of ordinary skill in the art would simply need to appreciate the fixed base 101 could be redefined as the movable platform 102 and the movable platform 102 could be redefined as the fixed base 101 without changing where the spherical connection locations occur. Alternatively, the lower variable-length links 107-109 (109 not shown) may be spherically connected between the platform 102 and the base 101 at a first location on the platform perimeter and at a second location on the base perimeter, as shown in FIG. 6.

The reason there is not an embodiment shown where the upper variable-length links 107-109 (109 not shown) are spherically connected between the base 101 and the platform 102 at a first location on the platform perimeter and at a second location on the base perimeter while the lower variable-length links 104-106 (106 not shown) are spherically connected between the base 101 and the platform 102 at a first location on the base perimeter and at a second location on the platform perimeter (i.e., a "bird cage"

design) is because this would restrict movement such that at least one degree of freedom is lost.

The primary function of the mechanism 100 is to adjust a movable platform 102 relative to a fixed base 101. More particularly, the platform 102 has five degrees of freedom with respect to the base 101, i.e., three translations and two rotations. The mechanism 100 effectively "points" towards a desired direction through the use of at least four total actuators (i.e., variable-length links 104-109 (106 and 109 not shown) to ensure proper functioning of the mechanism 100. The primary draft load is generally carried through the fixed-length link 103, however more variable-length links 104-109 (106 and 109 not shown) may be incorporated to hold working forces, as is shown in FIGS. 1-6. Selecting the number of variable-length links 104-109 (106 and 109 not shown) is a balancing act: using more actuators adds more weight, cost, geometric complexity (thus increasing the chance of collisions between components); on the other hand, using more actuators increases the stability and load carrying capacity of the device.

In a preferred embodiment, the base 101 and the platform 102 are constructed with symmetry around the z-axes. The single fixed-length link 103 ends are centered in the base 101 and the platform 102 and has a device that restricts relative rotation between the base 101 and the platform 102. Two or more lower variable-length links 104-106 (106 not shown) and two or more upper variable-length links 107-109 (109 not shown) are spaced radially and equidistant from each other and offset one-half the distance from each other base 101 to platform 102 on the z-axis. In another embodiment, one variable-length link 106, 109 (not shown) can be removed from each set of variable-length links to form the minimum number of actuators required to control the mechanism 100. The third, fourth and so on variable-length link 106, 109 (not shown) in each set over-constrains the model, but if allowed to float during adjustment, and clamped in position may be useful for attaining and holding higher stall loads. One of ordinary skill in the art would simply need to appreciate that an air bag with numerous individual air vessel chambers in which the pressure of each cell is adjusted and controlled individually, could also be used as variable-length links.

When equipped with the appropriate drive components, the mechanism 100 repositions transmission devices 121-122 coupled to the mechanism 100, such as tires, propellers, and jets, etc. so that power from the power transmission device is smoothly redirected via the translations and rotations imparted to the platform 102 by the variable-length links 104-109 (106 and 109 not shown). The transmission devices 121-122 are preferably coupled to the mechanism 100 with base powered transmission shaft 110 axially connected to the base 101 and a platform rotating shaft 112 axially connected to the platform, as shown in FIGS. 1-6. However, it should still be appreciated that in order for the mechanism 100 to adjust the platform 102 to "point" in a desired direction, no rotating components 110-112, 121-122 need actually be incorporated. For example, the mechanism 100 can be used for a powered as well as a non-powered wheel transmission device 122, when only a spindle, without a powered axle, is present in the device.

Figure 3:
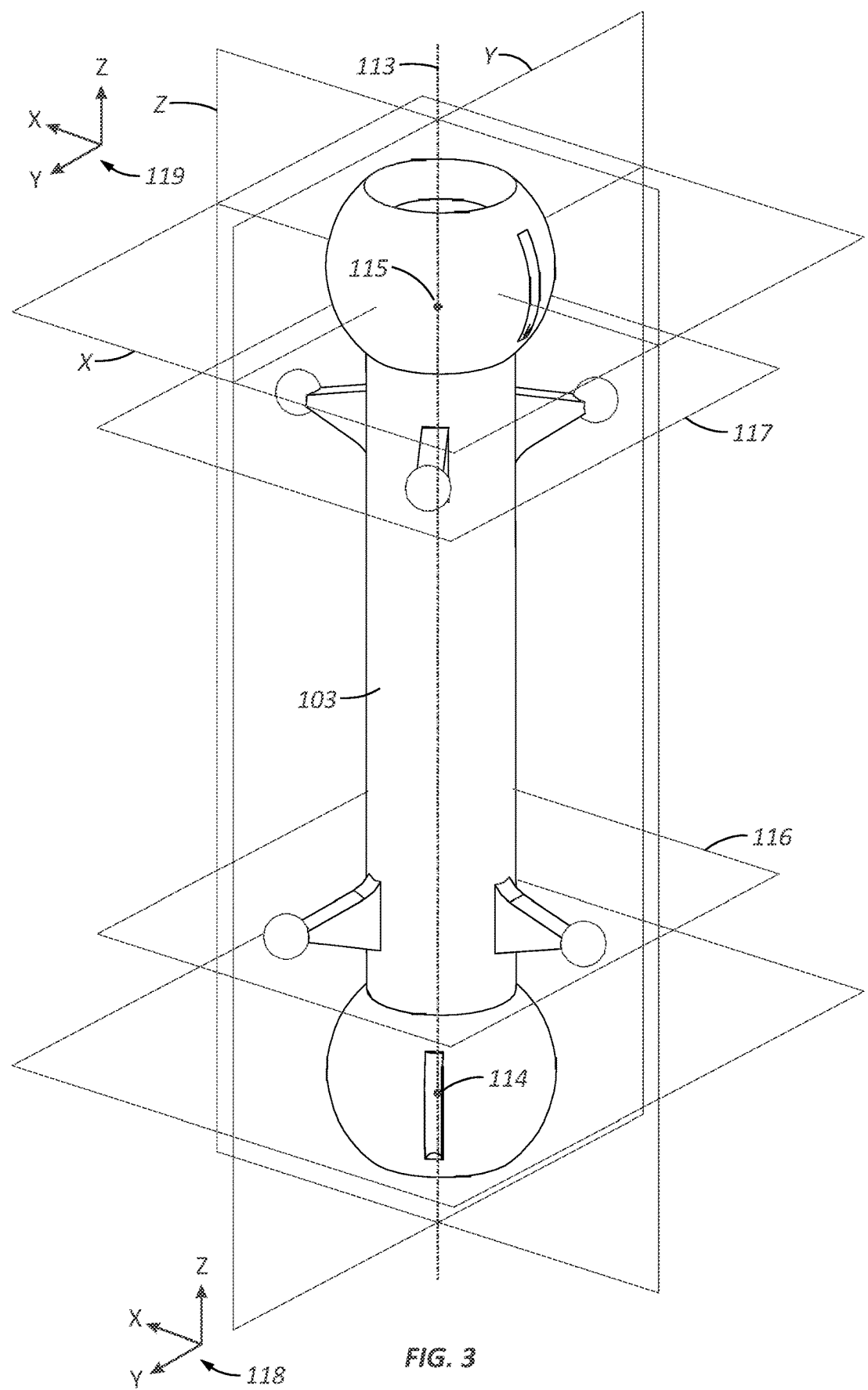
FIG. 3 shows a perspective view of a fixed-length link which depicts in particular the longitudinal axis, base link anchor surface, according to some aspects of the present disclosure.
Figure 4:
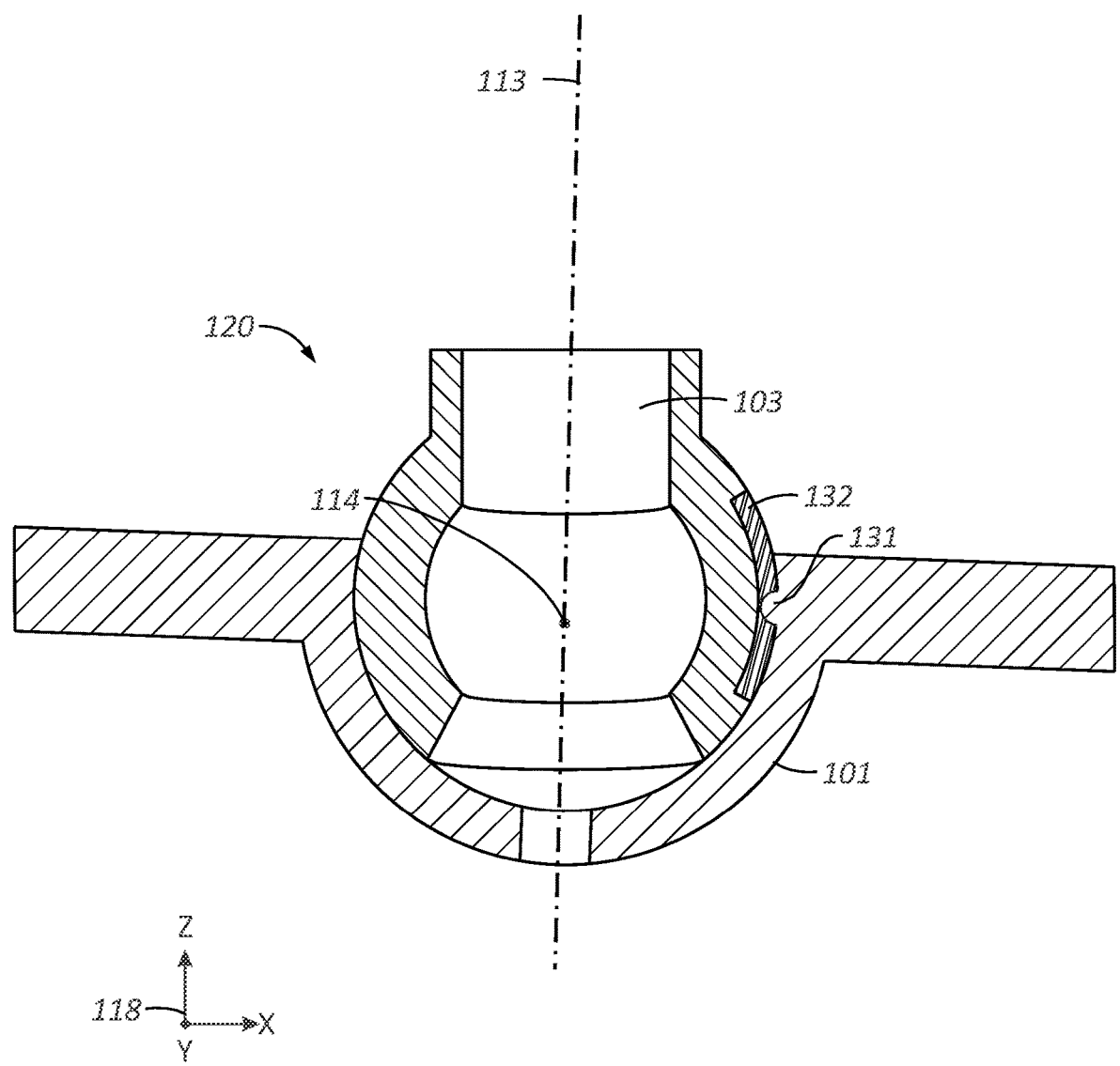
FIG. 4 shows a cross-section view of one means for preventing rotation of a fixed-length link relative to the rigid frame and around a longitudinal axis passing through the base origin, i.e., a spherical joint constraint around one axis of rotation, according to some aspect of the present disclosure. While reference numerals of FIG. 4 relate to the base and base origin, it should be appreciated the platform and platform origin will produce a substantially identical view.

FIG. 3 depicts a base 101, and preferably a fixed base, containing a stationary local reference framework with respect to an x-y plane at the base origin 114 with orthogonal axes x, y, and z. The base 101 includes at least a portion of a spherical connection 120, i.e., the ball of a ball joint including the spherical pin-biaxially curved slot of a ball joint, or a homokinetic joint at the base center 114. For example, the embodiment shown in FIG. 4 prevents rotation about the longitudinal axis 113 by means of the spherical pin-biaxially curved slot in the spherical fixed-length link 103 ends. More particularly, FIG. 4 is the spherical pin 131 of the base 101 sliding in the biaxially curved slot 132 in the pivotal connection 120 at the base end of the fixed-length link 103. It should be appreciated the pin-slot at each end of the fixed-length link 103 is only one means of preventing such rotation. Other means could also prevent rotation such as, but not limited to, a universal or a homokinetic (constant velocity) joint.

The slots 132 is indexed on the fixed-length link 103 to time the location of the variable-length links 104-109 (106 and 109 not shown) around the perimeter of the base 101 and platform 102, respectively. The indexing is related to the number of variable-length links 104-109 (106 and 109 not shown) are utilized. Given that N is the number of variable-length links used, and N is always even at least four, then the slot at the base 132 and the slot 132' at the platform end of the fixed-length link are indexed by the following formula:

$$\text{Slot index angle (in degrees)} = 180 \times (360/N) \text{ clockwise or counter-clockwise} \quad (1)$$

The platform origin 115 can be substantially identical to the base origin 114 with respect to spherical pin-biaxially curved slot except in that the platform origin 115 would be offset by a given angle to time the variable-length link 104-109 (106 and 109 not shown) connections. Thus, while the reference numerals of FIGS. 3-4 relate to the base 101 and base origin 114, it should be appreciated the platform 102 and platform origin 115 will produce a substantially identical view. More particularly, the platform 102 would be oriented with a cavity facing downward with its own orthogonal coordinates x''', y''', and z''' aligned with the base reference framework.

Figure 5:
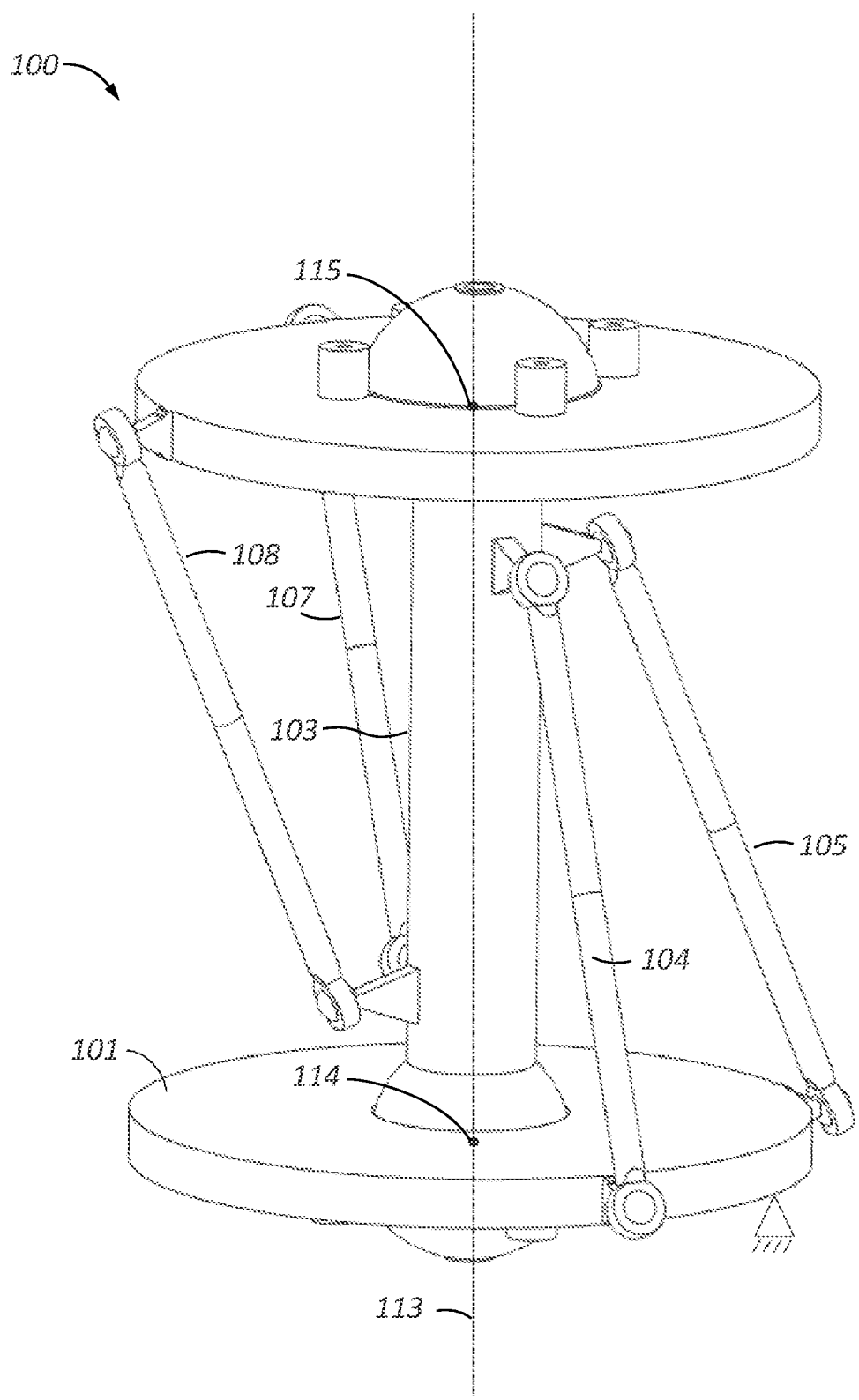
FIG. 5 shows a perspective view of an embodiment for a mechanism combining articulation and side-shift which depicts platform variable-length links attached to the fixed-length link, according to some aspects of the present disclosure.

The platform origin 115 movement is controlled by the upper variable-length links 107-109 (106 and 109 not shown) and can be translated with respect to the x and y axes. The z-axis location of the platform origin 115 is dependent upon the position of the fixed-length link 103 and is controlled by the spherical boundary generated by the fixed-length link 103 and the respective x and y translations. As shown in FIG. 5, the upper variable link links 107-109 (109 not shown) are attached in at least two points to the fixed-length link 103 which define a platform link anchor surface 116 with its own orthogonal coordinates x', y', and z'. The lower variable link links 104-106 (106 not shown) are attached to the fixed-length link 103 at two or more points which define a base link anchor surface 117 with its own orthogonal coordinates x'', y'', and z''. The x-axis is always parallel to the x', x'', and x''' axes. The y-axis is always parallel to the y', y'', and y''' axes.

As shown in FIG. 6, at least two equally spaced lower variable-length links 104, 105 connect the base 101 to the fixed-length link 103 and are used for positioning the fixed-length link 103 relative to the base 101. The lower variable-length links 104-106 (106 not shown) extend from the base 101 and connect to the base link anchor surface 117 at points that lie encircled around the longitudinal axis 113 on a plane normal to the fixed-length link 103 at x'', y'', and z'' between points x', y', and z' and the platform origin 115, respectively.

As shown in FIGS. 5 and 7, 8, 10-13, at least two equally spaced upper variable-length links 107-109 (109 not shown) connect the platform 102 to the fixed-length link 103 or alternatively connect the platform 102 to the base 101 (FIG. 6). The upper variable-length links 107-109 are used for positioning the platform 102 relative to the fixed-length link 103 (FIGS. 5 and 7, 8, 10-13) or the base 101 (FIG. 6). The upper variable-length links 107-109 (109 not shown) extend from the platform 102 and connect to the base link anchor surface 117 at points that lie encircled around the longitudinal axis 113 on a surface normal to the longitudinal axis 113 of fixed-length link 103 at x", y", and z" between points x', y', and z' and the base origin 114, respectively.

Figure 12:
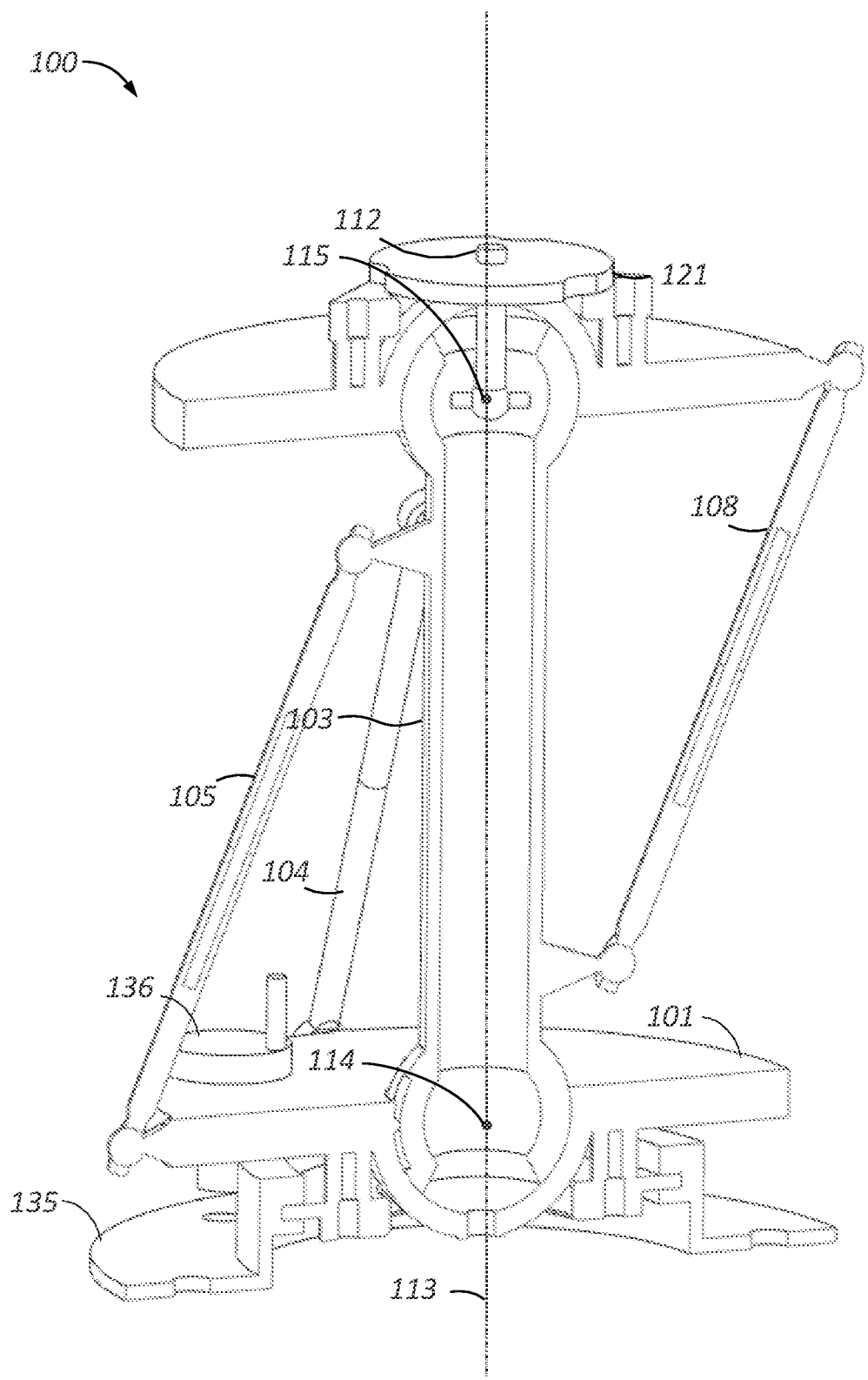
FIG. 12 shows a cross-section view of an embodiment for a mechanism combining articulation, side-shift and indexing which depicts non-powered load and rotary transmission, according to some aspects of the present disclosure.
Figure 13:
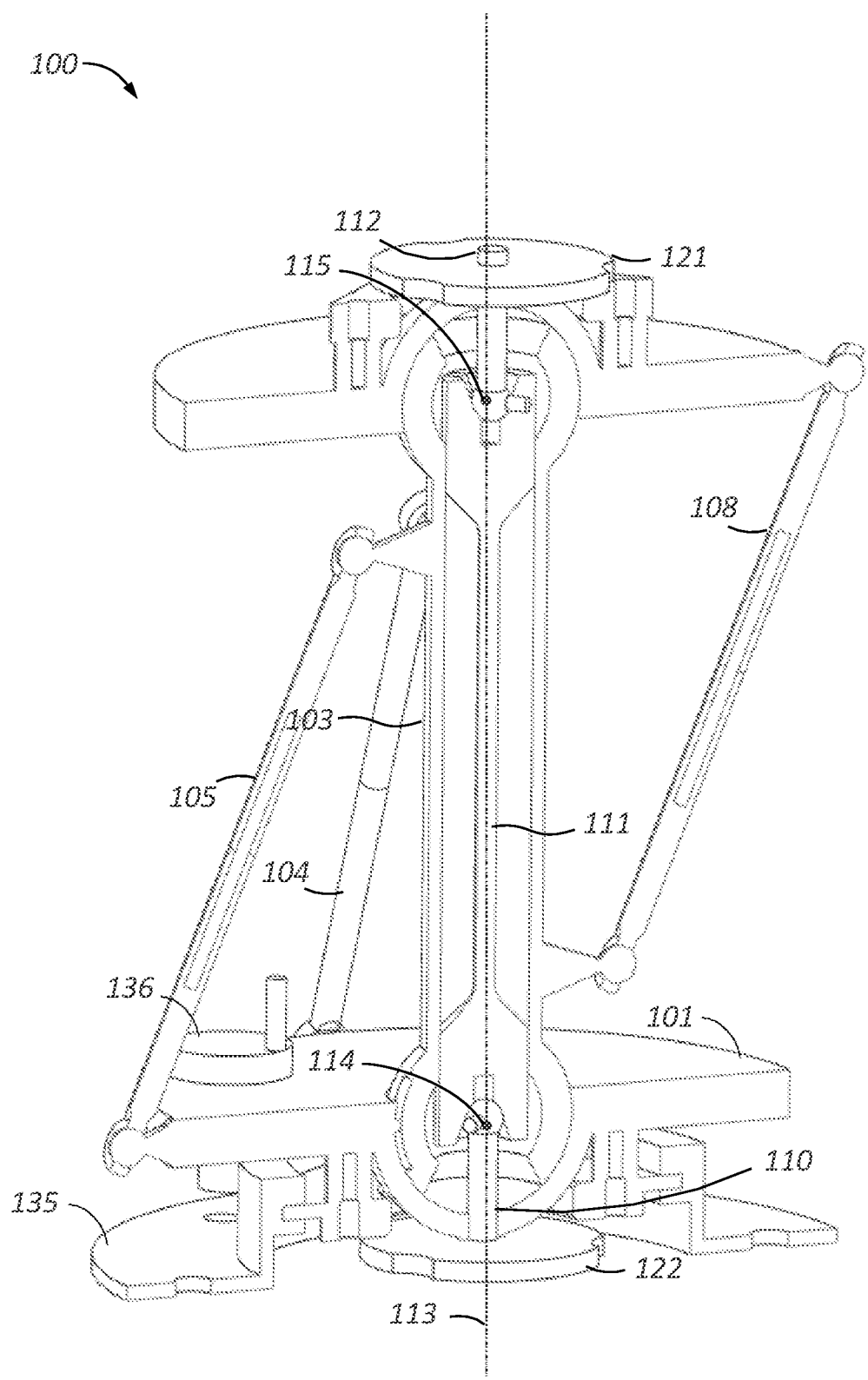
FIG. 13 shows a cross-section view of an embodiment for a mechanism combining articulation, side-shift and indexing which depicts powered load and rotary transmission, according to some aspects of the present disclosure.

Other devices may be attached to the base 101 and the platform 102 that include static position or normal rotation. For example, FIG. 12 shows how a singular transmission device 121 could be positioned to rotate normal to the platform 102 by way of a platform rotating shaft 112.

Figure 9:
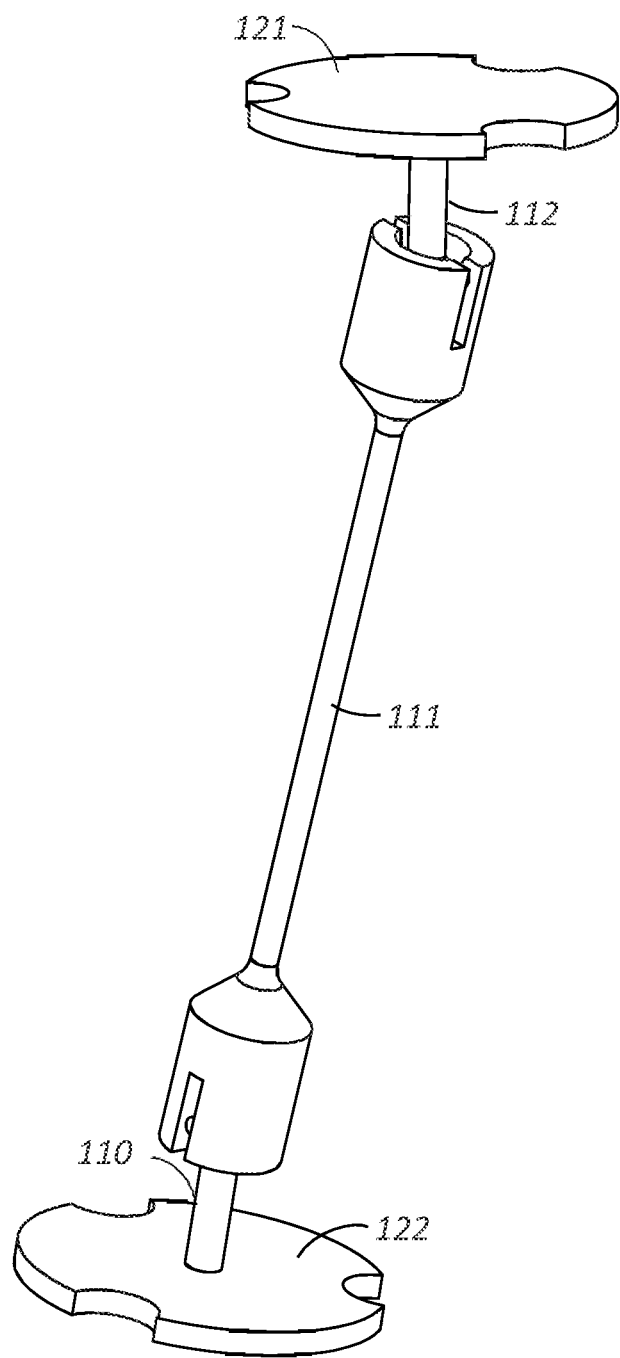
FIG. 9 shows a perspective view depicting the power train and how power transmission devices are attached to the rotating shafts and internally routed through the base, the hollow fixed-length link and the platform of the mechanism combining articulation and side-shift, according to some aspects of the present disclosure.
Figure 10:
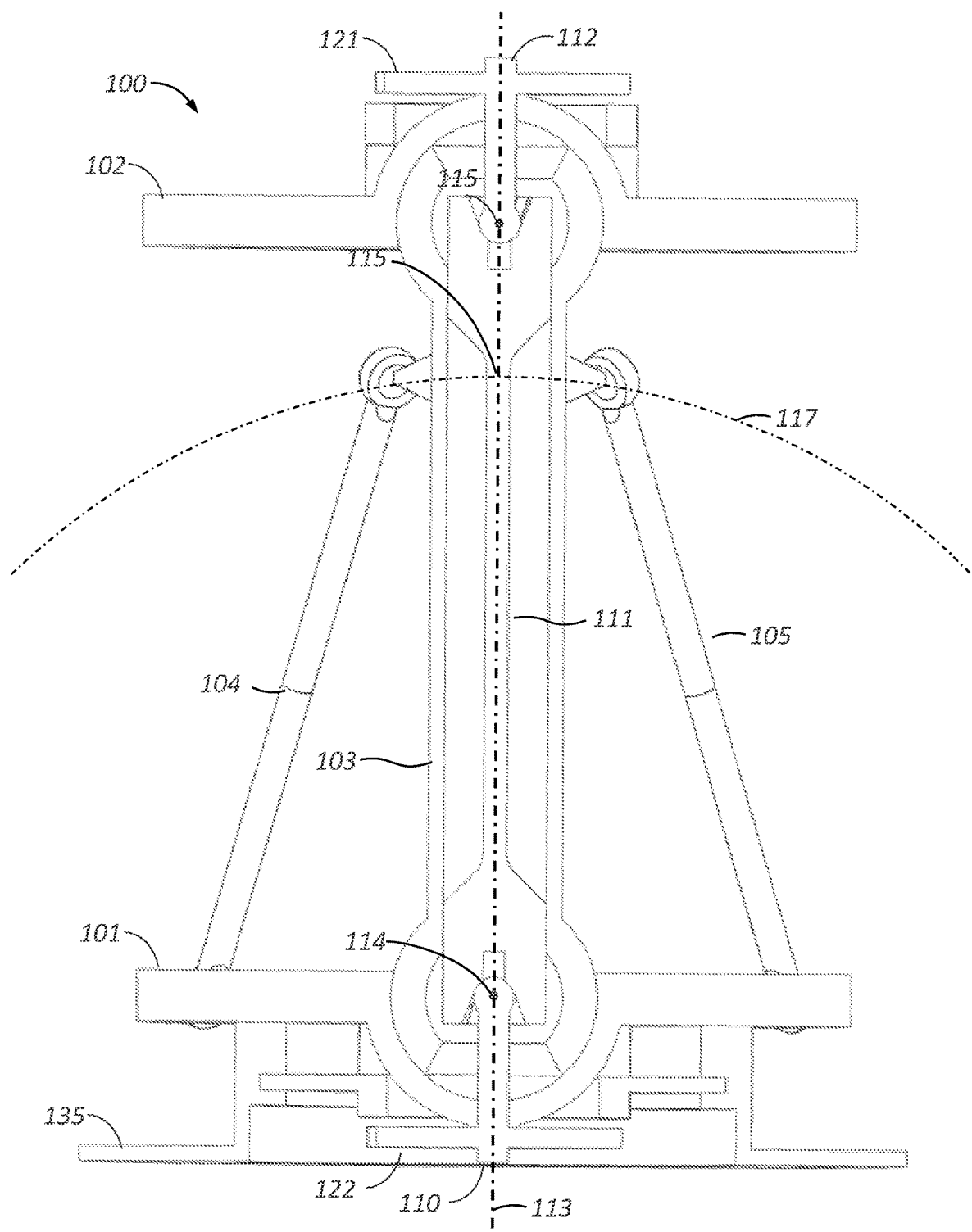
FIG. 10 shows a cross-section view of an embodiment for a mechanism combining articulation, side-shift and indexing which depicts a turntable coupled to the base, according to some aspects of the present disclosure.
Figure 11:
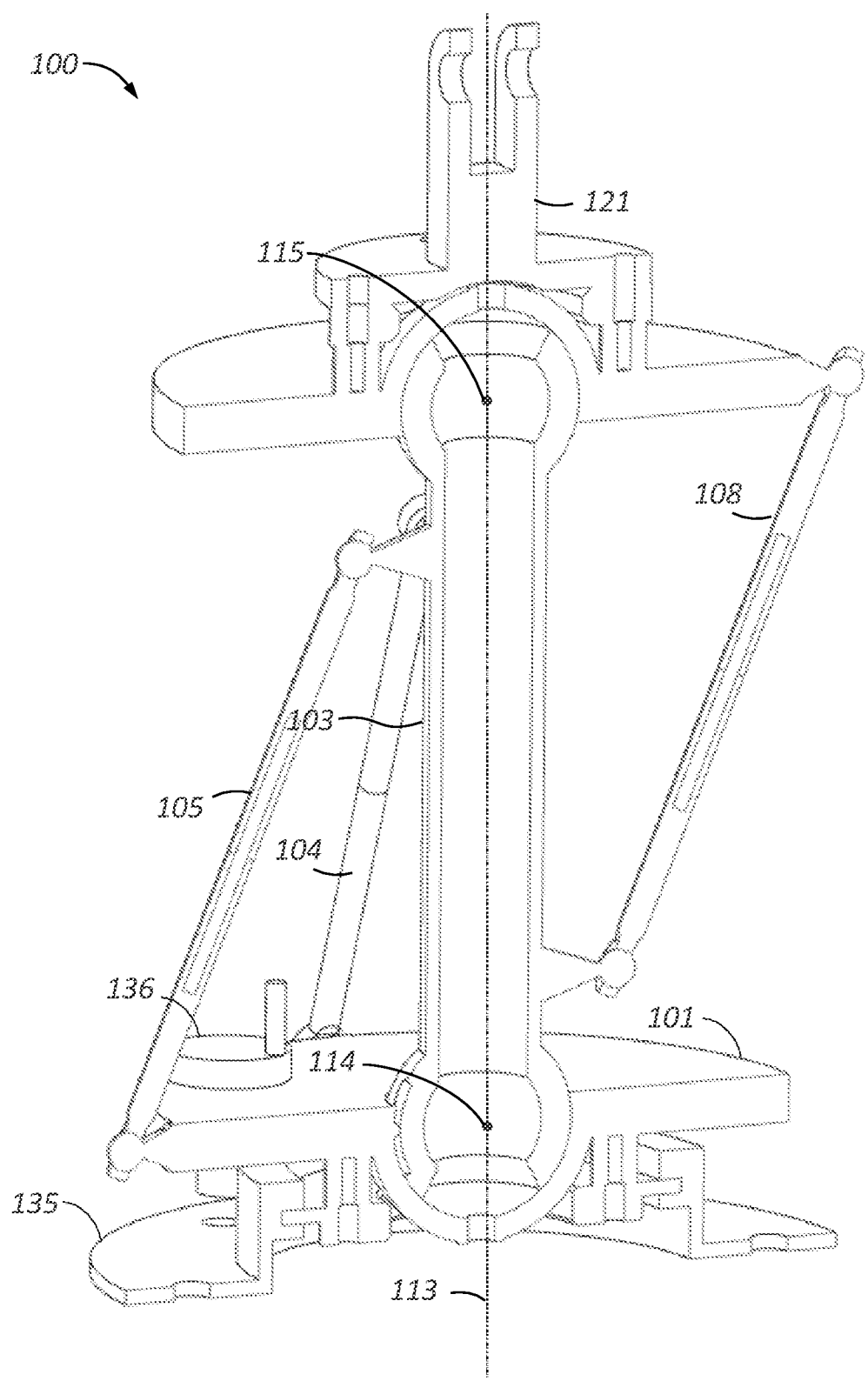
FIG. 11 shows a cross-section view of an embodiment for a mechanism combining articulation, side-shift and indexing which depicts a load transmission configuration, according to some aspects of the present disclosure.

Rotational power may also be transmitted through the fixed-length link 103 by means of a solid shaft 111 and homokinetic joints or by flexible power shaft. It is to be appreciated "power transmission devices" (PTDs) refer to any components which transmits power and comprises at least some of the components of FIG. 9 such shafts 110, 112, the solid shaft 111, and universal or Rzeppa-style homokinetic joints, reasonable or known alternatives to said components such as flexible shafts for power transmission, and the base and platform transmission devices 121/122 of FIGS. 7, 8, 10 and 13.

Figure 14:
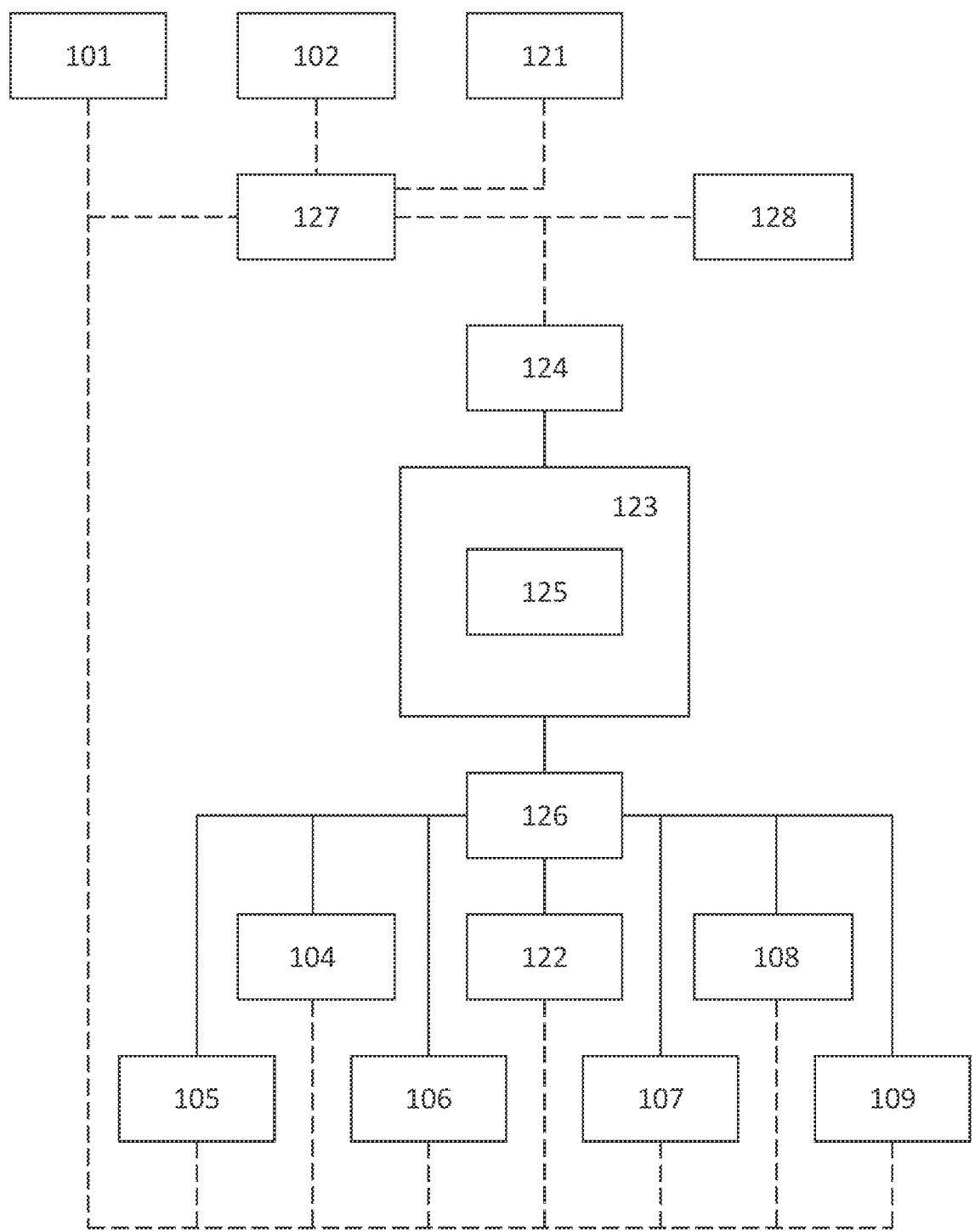
FIG. 14 depicts a flow chart of an intelligent control receiving an input, executing an algorithm based on the received input, and transmits an output based on at least one calculation performed in the algorithm, according to some aspects of the present disclosure.

FIG. 14 shows in particular an intelligent control 123 receiving an input 124 and transmitting an output 126. The output 126 is determined with calculations performed in an algorithm 125. The algorithm is executed based on at least the received input 124 and aims to determine and control a location of the platform origin 115 and base origin 114 to orient the platform 102 and the base 101. The input 124 may be continuously received by the intelligent control 123 such that the intelligent control is able to continuously control a location of the platform origin 115 and base origin 114 to orient the platform 102 and the base 101. Such control and orientation allow for the intelligent control 123 to reposition base and platform transmission devices 121/122, such as a drawbar.

The intelligent control 123 may include communication components, a display, or a combination thereof. Examples of such an intelligent control 123 may be a tablet, a telephone, a handheld device, a laptop, a user display, a gaming controller (i.e. PlayStation controllers), or generally any other computing device capable of allowing input 124, providing options, and showing output 126 of electronic functions. Still further examples include a microprocessor, a microcontroller, or another suitable programmable device and a memory. The intelligent control 123 also can include other components and can be implemented partially or entirely on a semiconductor (e.g., a field-programmable gate array ("FPGA")) chip, such as a chip developed through a register transfer level ("RTL") design process.

The memory includes, in some embodiments, a program storage area and a data storage area, such as the database 128. The program storage area and the data storage area can include combinations of different types of memory, such as read-only memory ("ROM", an example of non-volatile memory, meaning it does not lose data when it is not connected to a power source) or random-access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. In some embodiments, the processing unit of the intelligent control 123, such as a processor, a microprocessor, or a microcontroller, is connected to the memory and executes software instructions that are capable of being stored in a RAM of the memory (i.e., during execution), a ROM of the memory (i.e., on a generally permanent basis), or another non-transitory computer readable medium such as another memory or a disc.

The input 124 may relate to an environmental condition such as a quantity of sunlight or soil characteristics or may be preloaded from a database 128. Furthermore, it is contemplated that the mechanism 100 includes a sensor 127 or modules for sensing the input 124. The sensor 127 can be placed on or around the mechanism 100 to provide information to the intelligent control 123. The sensor 127 or modules may be selected from the group comprising vision sensors, radar sensors, LIDAR sensors, heat/temperature sensors, solar azimuth and orientation sensors, moisture content sensors, radio frequency sensors, short-range radio, long-range radio, antennas, accelerometers, position sensors, pressure sensors, force sensors, and fluid level sensors. The sensor 127 can be grouped together with other sensors in any manner and can be used to determine many aspects. To elaborate, the accelerometers could sense acceleration of an object in a variety of directions (i.e., an x-direction, a y-direction, etc.). The position sensors could sense the position of one or more components of an object. Pressure sensors could sense the pressure of a gas or a liquid. The fluid level sensors could sense a measurement of fluid contained in a container or the depth of a fluid in its natural form such as water in a river or a lake. Fewer or more sensors can be provided as desired. For example, a rotational sensor can be used to detect speed(s) of object(s), motion or distance sensors can be used to detect the distance an object has traveled, one or more timers can be used for detecting a length of time an object has been used and/or the length of time any component has been used, and temperature sensors can be used to detect the temperature of an object or fluid.

The algorithm 125 executed by the intelligent control 123 may utilize some or all of the following calculations, which are typically made with respect to the mechanism 100 combining articulation, side-shift and indexing.

The coordinates of an origin of the base link anchor surface 117, $O_{BLA}$, can be defined by three translational displacements with respect to the base reference framework, one for each orthogonal axis, where vector $T_{BLA}$, of fixed length $l_{0BLA}$, is the translation vector of $O_{BLA}$ with respect to the base reference framework.

The $x_0$ and $y_0$ coordinates of $O_{BLA}$ are obtaining by projecting $T_{BLA}$ onto the base x-y plane. The values result from the combination of the rotation angle $\alpha$ (orientation) and angle $\beta$ (tilt), measured from the base x-z plane and the base z-axis, respectively. The following equations provide $O_{BLA}$ displacements from the base origin 114, $O_B$, based on the varying rotation and tilt angles of the fixed-length link 103:

$$x_0 = l_0 * (\sin\beta \cos\alpha) \qquad (2a)$$

$$y_0 = l_0 * (\sin\beta \sin\alpha) \qquad (2b)$$

In general, $z_0$ is the height of the $O_{BLA}$ above the base x-y plane. The height is determined by the equation:

$$z_0 = l_0 * \sqrt{1-((\sin\beta\cos\alpha)^2+(\sin\beta\sin\alpha)^2)} \qquad (2c)$$

In the special case, $\beta=0$, $\alpha$ can range from 0 to a radians; however, by definition, the displacements $x_0$ and $y_0$ are zero along both the x-axis and the y-axis, respectively, and displacement along the z-axis is $z_0=l_0$.

Similarly, since they also lie on the same longitudinal axis 113, the $O_B O_{PLA}$ axis, the coordinates of $O_{PLA}$ and the platform origin 115, $O_P$, can be determined by three translational displacement with respect to the base reference framework, one for each axis.

Two angular displacements define the orientation of the platform 102 with respect to the platform link anchor surface 116, which in this case is a plane. A set of Euler angles are used in the following sequence. The fixed-length link 103 is constrained at both ends to prevent longitudinal axis 113 ($O_B O_P$ axis) rotation. Thus, there is no rotation w (yaw) about the z-axis of the platform 102.

Rotate an angle θ (pitch) around the y-axis of the platform 102:

$$R_y(\theta) = \begin{pmatrix} \cos\theta & 0 & \sin\theta \\ 0 & 1 & 0 \\ -\sin\theta & 0 & \cos\theta \end{pmatrix} \quad (3a)$$

Rotate an angle φ (roll) around the x-axis of the platform 102:

$$R_x(\psi) = \begin{pmatrix} 1 & 0 & 0 \\ 0 & \cos\varphi & -\sin\varphi \\ 0 & \sin\varphi & \cos\varphi \end{pmatrix} \quad (3b)$$

The full rotation matrix of the platform 102 relative to the platform link anchor surface 116 is then given by:

$$M^P R_B = R_y(\theta) * R_x(\psi) = \begin{pmatrix} \cos\theta & 0 & \sin\theta \\ 0 & 1 & 0 \\ -\sin\theta & 0 & \cos\theta \end{pmatrix} * \begin{pmatrix} 1 & 0 & 0 \\ 0 & \cos\varphi & -\sin\varphi \\ 0 & \sin\varphi & \cos\varphi \end{pmatrix} \quad (3c)$$

$$M^P R_B = \begin{pmatrix} \cos\theta & \sin\theta\sin\varphi & \sin\theta\cos\varphi \\ 0 & \cos\varphi & -\sin\varphi \\ -\sin\theta & \cos\theta\sin\varphi & \cos\theta\cos\varphi \end{pmatrix} \quad (3d)$$

Figure 15:
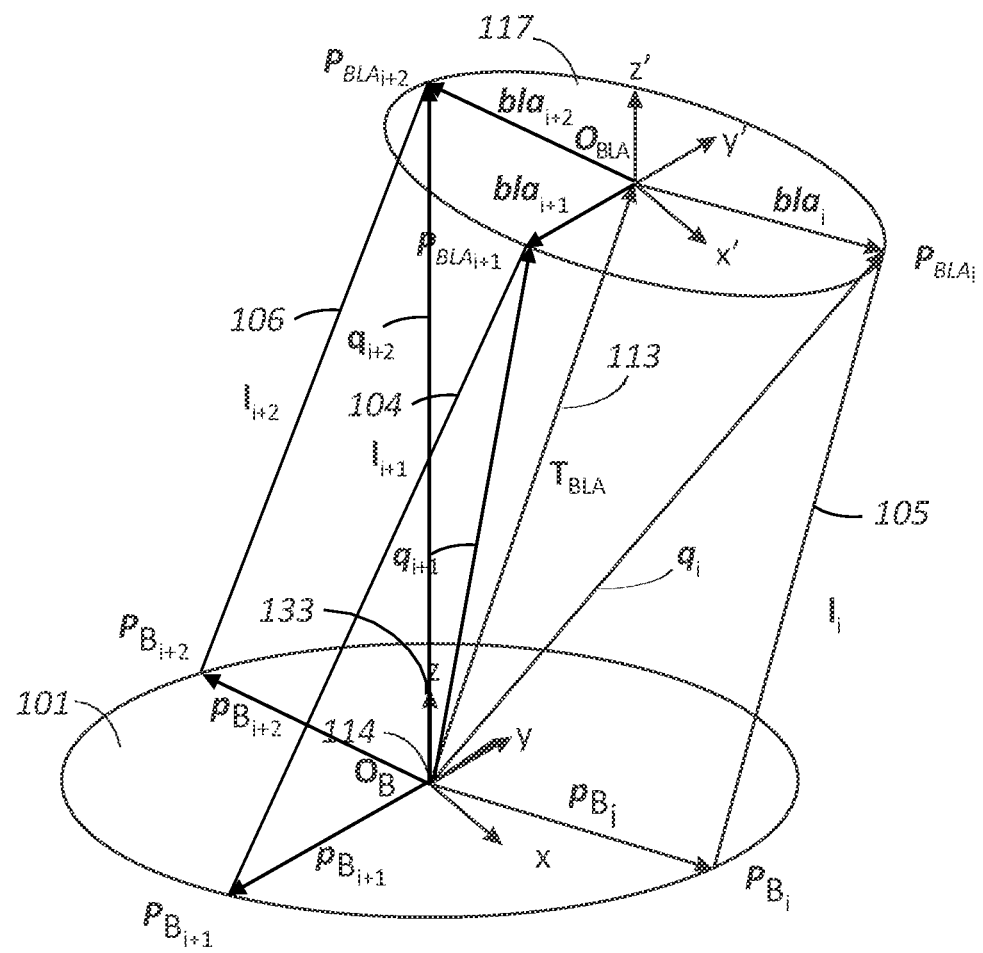
FIG. 15 shows a geometric view of the base with respect to the base link anchor surface including the variables used to calculate the position of the fixed-length origins and the orientation of the longitudinal axis of fixed-length link, according to some aspects of the present disclosure. While the reference numerals of FIG. 15 relate to the base and base origin, it should be appreciated the platform and platform origin will produce a substantially identical view.
Figure 16:
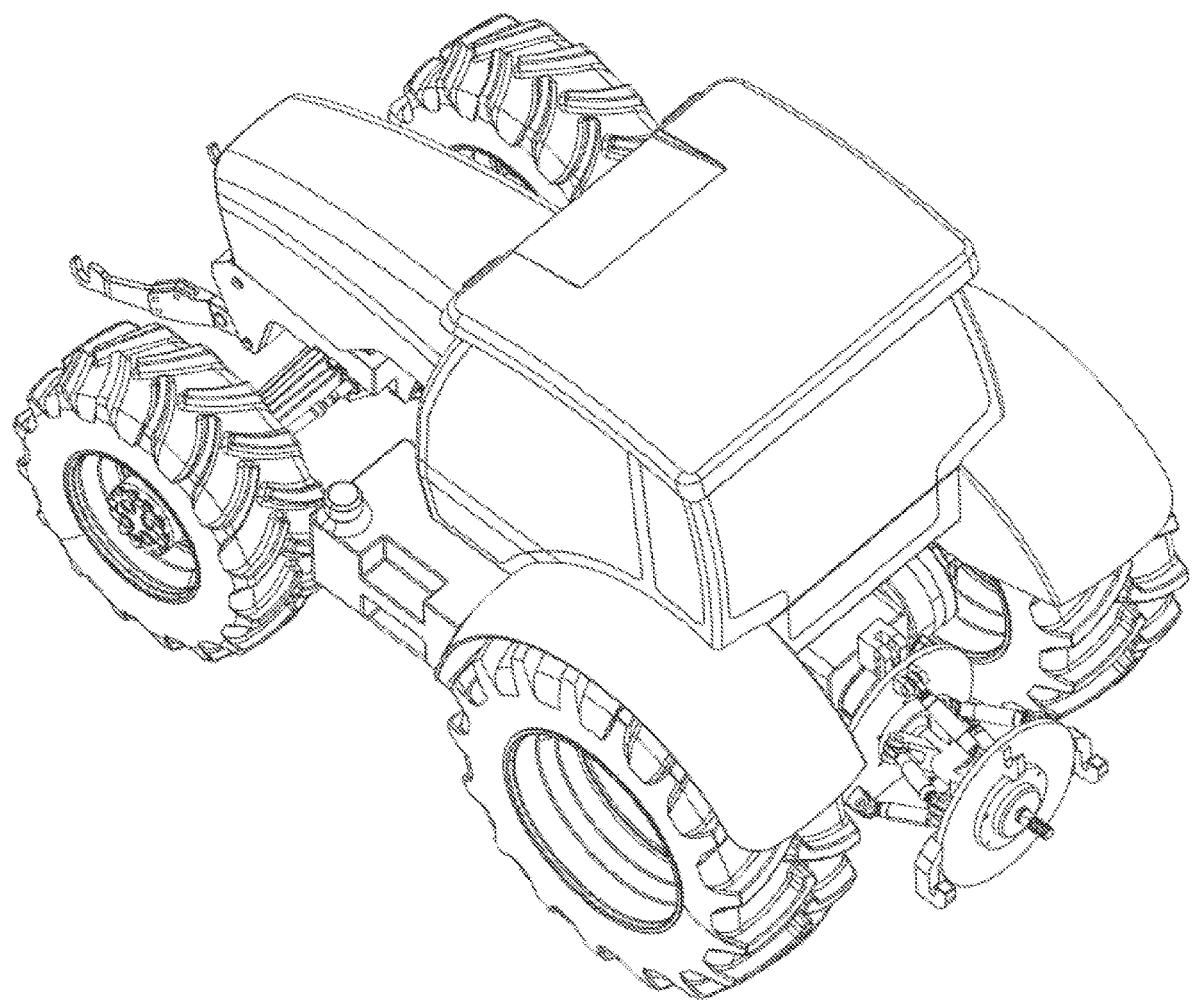
FIG. 16 a perspective view of an embodiment for a mechanism combining articulation and side-shift which depicts a combination of both side-shift and steer row guidance, including all the traditional three-point hitch functions on an agricultural tractor to connect draft and mounted implements with a PTO connection, according to some aspects of the present disclosure.

The orientation of the platform 112 normal vector with respect to the platform link anchor surface 116 can thus be determined. Control systems make use of these parameters as well. Now consider the platform 112, P, as shown in FIG. 15. For the $i^{th}$ link the vector coordinates $q_i$ of the anchor point $P_i$ with respect to the platform link anchor surface 116 reference framework are given by the following equation:

$$q_i = T + M^P R_B * p_i \quad (4)$$

Wherein $T_{PLA}$ is the length of the vector from $O_{PLA}$ to $O_P$ and $pla_i$ is the vector defining the coordinates of the anchor point $P_{PLAi}$ with respect to the platform reference framework.

Similarly, the length of the $i^{th}$ actuator is given by the equation:

$$l_i = q_i - pla_i \quad (5)$$

wherein $pla_i$ is the vector defining the coordinates of the lower anchor point $P_{PLAi}$. These equations thus give the lengths of the two or more upper variable-length links 107-109 (109 not shown) or actuators to achieve the desired position and attitude (orientation) of the platform 102.

There is enough information to calculate the lengths of the effective "actuators" for the reverse kinematics of the platform. The calculations can be captured and embodied in a spreadsheet having calculation capabilities, graphing tools, pivot tables, and a macro programming language such as Microsoft Excel. The spreadsheet can then be used to drive CAD models having variable-length links 107-109 (109 not shown).

To implement the mechanism 100, one needs to consider the following different modes of operation:
"Calibration"
"Home"
 The first step is to calibrate the mechanism 100 to a home position. The home position is preferably where the platform 102 is at a height $z_0 = l_0$ above the base framework and there is no other translation or rotational movement; i.e., $\theta = \varphi = \psi = 0$.
"Trim"
 Depending on the mode of operation, it may be desirable to provide a trim position such that the mechanism 100 returns to a preset position when the controls are released.
"Positioning"
"Defined vector"
 Calculated positions; i.e., follow the sun
"Single-joystick"
 Directed motion; defined by only the normal of the fixed-length link 103
 T vector ratioed-angle; the normal of the fixed-length link 103 is always ratioed to the normal of the platform 102, directed in the same plane
"Dual-joysticks"
 Directed motion defined by both the normal of the fixed-length link 103 and the normal of the platform 102
"Position held upon control release" (all cases)

One must also consider the characteristics and tolerances of the controller and actuators in the system, as well as limitations induced by the geometry of the actuators with respect to the base 101 and the platform 102, i.e., interference between the components of the mechanism 100.

The circuitry of the intelligent control 123 used to control the platform 102 may be based on a C++ program communication via USB connections attached to linear actuator controllers.

An example sequence of events may be as follows:
1. Input the positional information for the base 101, platform 102, and fixed-length link 103; i.e., $l_0$, $l_{OBLA}$, $l_{OPLA}$, $bla_i$, $pla_i$, $b_i$, $p_i$. These are all constraints from the build of the mechanism 100.
2. Input the constraints for the rate and range of movement.
3. Input the variables for (α, β, θ, and φ), those required for the platform position.
4. Calculate the values of $O_{P0}$ from Equation 1.
5. Calculate the rotational matrix $M^P R_B$ from Equation 2.
6. Calculate the effective variable-length link lengths $l_i$ from Equation 4.
7. Determine that the lengths do not exceed the constraints for rate and range of movement identified in the constraints in step 2.
8. Return to step 3 to repeat the process.

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

100 mechanism combining articulation, side-shift and indexing
101 base
102 platform
103 fixed-length link
104 first lower variable-length link
105 second lower variable-length link
106 third, fourth, or more, lower variable-length link
107 first upper variable-length link
108 second upper variable-length link
109 third, fourth, or more, upper variable-length link
110 base rotating shaft
111 intermediate power transmission shaft (with pin-in-slot, universal or homokinetic joints or a flexible power shaft)
112 platform rotating shaft (power or non-power transmitting)
113 longitudinal axis of fixed-length link
114 base origin/base center/base center origin
115 platform origin/platform center/platform center origin
116 platform link anchor surface (i.e., generally a planar surface, or a spherical surface centered at the base origin)
117 base link anchor surface (i.e., generally a planar surface, or a spherical surface centered at the platform origin)
118 base origin plane
119 platform origin plane
120 pivotal connection (i.e. spherical joint where a spherical pin in biaxially curved slot, a universal joint or a homokinetic joint, such as a Rzeppa-style constant velocity joint, restricts axial rotation about the longitudinal axis of the fixed-length link)
121 platform transmission device (i.e. a drawbar, a quiktatch hitch a solar mirror, solar tracking umbrella, an automotive wheel, a gearbox, a fan, a propeller, a water nozzle, a rocket engine, etc.)
122 base transmission device (i.e. a stand with electric motor, a vehicle Power-Take Off (PTO) shaft, a drive shaft, an axle shaft, engine flywheel, etc.)
123 intelligent control
124 input
125 algorithm
126 output
127 sensor
128 database
129 base, platform, split fixed-length link with universal joints, variable-length links
130 coupler, with indexing (optional)
131 base, platform, fixed-length link, variable-length links with manual turnbuckles
132 base, platform, fixed-length link, variable-length links adjusted for slight articulation and side-shift
133 base normal vector
134 platform normal vector
135 turntable
136 turntable indexer The mechanism combining articulation and side-shift used in a system provides several advantages. The following list is not meant to be exclusive, but includes:

A mechanism and a methodology for simultaneously positioning a platform origin relative to a base origin and orienting the platform relative to the base.

An animated yard decoration consisting of a draped inflatable skin that moves relative to a mechanism that articulates and side shifts while rotating on a turntable.

A mechanism for aligning an antenna mounded to the platform for sending or receiving satellite communications, for positioning and orienting the shade during the day to a designated area on the ground or an elevated surface lying beneath a parasol mounded to the platform, or for tracking a mirror mounded to the platform to reflect the solar energy toward a thermal energy generator tower, throughout the day.

A method to control the relative position of an agricultural implement pulled by a tractor with a subject hitch mechanism relative to the rows of crop in a field. The mechanism provides row guidance for both directional and non-directional implements, alike.

Furthermore, a mechanism and a methodology for simultaneously positioning a platform origin relative to a base origin and orienting the platform relative to the base to align or control the vector of draft or thrust loads. The primary component of load transfer is through the fixed-length link connecting the base and the platform. Secondary loads are used to steer the 3D mechanism via four or more variable-length links.

A method for orienting a 3D propulsion vector with respect to the center of mass for a vehicle, such as a rocket, drone, aircraft or boat.

An axle mechanism to provide a ground engaging device adjustable caster, camber, toe-in, and steering angle on the go, such as for auto racing and/or rock climbing vehicle.

A mechanism to allow an aircraft to land with the longitudinal axis of the craft aligned with the runway heading during a crosswind maneuver.

A coupling mechanism to attach an implement more automatically to a tractor, thus reducing an operator's exposure to crush or nip point injuries during the coupling process.

The present disclosure is not to be limited to the particular embodiments described herein. The following claims set forth a number of embodiments of the present disclosure with greater particularity.

What is claimed is:

1. A method for providing lateral shifting and articulation capabilities comprising:
carrying a primary draft load between a platform (102) and a base (101) with a fixed-length link (103), said fixed-length link (103) having a longitudinal axis (113) running between the platform (102) and the base (101);
allowing for translation in at least two orthogonal directions of a platform center (115) located on the platform (102) with respect to a base center (114) located on the base (101);
restricting rotation of the fixed-length link (103), the platform (102), and the base (101) around the longitudinal axis (113);
allowing for rotation of the platform (102) with a set of upper variable-length links (107, 108, 109) pivotally connected to the platform (102) and the fixed-length link (103); and
allowing for rotation of the base (101) with a set of lower variable-length links (104, 105, 106) pivotally connected to the base (101), and either
(a) the fixed-length link (103) or
(b) the platform (102).

2. The method according to claim 1 further providing indexing capabilities comprising:
allowing for rotation of a turntable (135) attached to the base (101) on a longitudinal axis through the base center (115) wherein the angular rotation is controlled by a turntable indexer (136) comprising a floating pin-in-slot, a torsional actuator, a roller belt or a gear set.

3. The method according to claim 2 further providing power transmission comprising:
transmitting power between a base transmission device (122) coupled to a base rotating shaft (110) rotationally connected to the base (101) and a platform transmission device (121) coupled to a platform rotating shaft (112) rotationally connected to the platform (102).

4. The method according to claim 3 further comprising:
Receiving an input (124) with an intelligent control (123); and
in response to receiving the input (124),
controlling with the intelligent control (123) a location of the platform origin (115) and base origin (114); and
controlling an orientation of the platform (102) and the base (101).

5. The method of claim 1 further comprising:
manually adjusting the length of each of the variable-length links (104, 105, 106, 107, 108, 109) by means of a mechanical turnbuckle; and
securing the variable-length links (104, 105, 106,107, 108, 109) in place to:
position the platform origin (115) and the base origin (114);
control an orientation of the platform (102) and the base (101); and
maintain a set position.

6. An attachment mechanism (100) comprising:
a base (101) having a base center (114) and a base perimeter;
a fixed-length link (103) comprising:
a base end pivotally connected to the base (101) at the base center (114);
a longitudinal axis (113) running from the base end to a platform end through the base center (114) and a platform center (115), respectively, wherein rotation of the fixed-length link (103) and the base (101) is restricted around the longitudinal axis (113),
a distance between the base end and the platform end that is constant, the distance extending from the base center (114) to the platform center (115) along the longitudinal axis (113); and
a set of at least two lower variable-length links (104, 105, and 106) each having a first end pivotally connected to the base perimeter, and
a second end pivotally connected to the fixed-length link (103), wherein the second end of the lower variable-link end extends away from the fixed-length link (103), and is connected to a lower-link anchor surface (117) near the platform end of the fixed-length link (103).

7. An attachment mechanism (100) according to claim 6 further comprising:
a platform (102) having a platform center (115) and a platform perimeter;
the fixed-length link (103) further comprising:
the platform end pivotally connected to the platform (102) at the platform center (115),
the longitudinal axis (113) running from the platform end to the base end through the platform center (115) and the base center (114), respectively, wherein rotation of the fixed-length link (103) and the platform (102) is restricted around the longitudinal axis (113); and
a set of at least two upper variable-length links (107, 108, and 109) each having a first end pivotally connected to the platform perimeter, and either
(a) a second end pivotally connected to the fixed-length link (103), wherein the second end of the upper variable-link end extends away from the fixed-length link (103), and connected to an upper-link anchor surface (116) near the base end of the fixed-length link (103); or
(b) a second end pivotally connected to the base perimeter.

8. The attachment mechanism (100) according to claim 7 wherein each pivotal connection (120) of the fixed length link (103) is formed with a spherical joint that is restricted from rotating around the longitudinal axis of the fixed length link (103) by a pin (131) in slot (132), universal, or a homokinetic joint at each end (114, 115) of the fixed length link (103) where it pivotally connects with the base (101) and platform (102), respectively.

9. The attachment mechanism (100) according to claim 7 wherein at least two pair of the variable-length links (104/107, 105/108, 106/109, . . . ) extend generally parallel to and are spaced equidistant from each other around the perimeter of the base and platform;
the variable-length links are added in pairs, one to the base and one to the platform; and either
(a) when there are just two pairs of variable length links (104/107, 105/108), the lower variable length links (104, 105) are connected consecutively to the base perimeter, then the first upper variable length link (107) is connected to the platform perimeter a quarter distance around the perimeter from the last lower variable length link (105), and the upper variable length link pairs (107, 108) are connected consecutively around the platform perimeter; or
(b) if there are more than two pairs, the variable length links (104/107, 105/108, 106/109, . . . ) are connected alternating between the base and the platform perimeters, connected first one to the base perimeter, then the next to the platform perimeter.

10. The attachment mechanism (100) according to claim 9 wherein each of the variable-length links (104, 105, 106, 107, 108, 109, . . . ) include a linear actuator with each end pivotal connection formed with a spherical joint.

11. The attachment mechanism (100) according to claim 10 wherein the fixed-length link (103) further comprises a rotating drive shaft (111) to transmit power, running axially through the fixed-length link (103),
coupling the base rotating shaft (110) and the platform rotating shaft (112) connected by pin-in-slot, universal or homokinetic joint at each end of the rotating drive shaft (111), and each end is coincident with the base center (114) or platform center (115), respectively, and
the base rotating shaft (110) is rotationally connected to the base (101) at the base center (114), and the platform rotating shaft (112) is rotationally connected to the platform (102) at the platform center (115).

12. The attachment mechanism (100) according to claim 7 wherein the base (101) is rotationally connected to the turntable (135) on a longitudinal axis of the base rotating shaft (110) passing through the base center (115).

13. The attachment mechanism (100) according to claim 12 wherein the turntable indexer (136) controls the relative angular orientation of the base (101) relative to the turntable (135).

14. The system according to claim 13 wherein the loads of the transmission device (121, 122) is operatively attached to a drawbar, an umbrella, a parasol, a satellite dish or an antenna, an array of solar panels, or a nozzle.

15. A system comprising:
   the attachment mechanism (100) according to claim 7 comprising:
   a transmission device (121, 122) attached to the base (101) and to the platform (102).

16. The system according to claim 15 further comprising a base transmission device (122) coupled to the base rotating shaft (110).

17. The system according to claim 16 further comprising:
   a platform transmission device (121) coupled to a rotating drive shaft (111) to transmit power, running axially through the fixed-length link (103);
   the platform rotating shaft (112); and
   the platform transmission device (122).

18. The system according to claim 16 wherein the output power transmission device (121) is operatively attached to either:
   (a) an automotive wheel and the input power transmission device (122) is operatively attached to a transmission output shaft to propel the vehicle when the tire is in contact with the terrain;
   (b) the output power transmission device (121) is operatively attached to a mounted agricultural implement and the input power transmission device (122) is operatively attached to a power take-off shaft for an agricultural vehicle to perform work in the field; or
   (c) the output power transmission device (121) is operatively attached to a rotorcraft blade hub, an aircraft propeller or a boat impeller and the input power transmission device (122) is operatively attached to an engine crank shaft for vehicle locomotion.

19. The system according to claim 15 wherein the transmission device (121) is operatively attached to an automotive non-powered wheel (and free to rotate) used for transmitting suspension and steering load purposes only.

\* \* \* \* \*